United States Patent [19]

Onaka et al.

[11] Patent Number: 5,469,288
[45] Date of Patent: Nov. 21, 1995

[54] OPTICAL FILTER, METHOD OF CONTROLLING TRANSMISSION WAVELENGTH THEREOF, AND OPTICAL RECEIVER USING THE METHOD

[75] Inventors: Hiroshi Onaka; Hideyuki Miyata, both of Kawasaki, Japan

[73] Assignee: Fujitsu Limited, Kawasaki, Japan

[21] Appl. No.: 125,742

[22] Filed: Sep. 24, 1993

[30] Foreign Application Priority Data

Feb. 9, 1993 [JP] Japan ................................ 5-044694

[51] Int. Cl.⁶ .................................................. H04B 10/06
[52] U.S. Cl. .......................... 359/189; 319/124; 319/194; 372/92
[58] Field of Search ........................ 359/124, 127, 359/189, 193, 194, 634; 385/24, 27; 372/92, 45, 50; 356/352

[56] References Cited

U.S. PATENT DOCUMENTS

| | | | |
|---|---|---|---|
| 4,861,136 | 8/1989 | Stone et al. | 385/27 |
| 5,023,947 | 6/1991 | Cimini, Jr. et al. | 359/189 |
| 5,283,845 | 2/1994 | Ip | 385/24 |

OTHER PUBLICATIONS

Eng et al., "Optical FDM Switch Experiments With Tunable Fiber Fabry–Perot Filters" Globecom '90: IEEE Global Telecommunications Conference and Exhibition. Communications: Connecting the Furture pp. 1529–1533, vol. 3, 2–3 Dec. 190.

Primary Examiner—Leo H. Boudreau
Assistant Examiner—Kinfe-Michael Negash
Attorney, Agent, or Firm—Staas & Halsey

[57] ABSTRACT

An optical filter selectively receives a signal of a desired optical frequency from a plurality of optical-frequency-division multiplexing signals. Additionally, a transmission wavelength of the optical filter can be controlled using an optical receiver which includes the optical filter. The optical filter can perform a narrow-band optical filtering and permit, in optical communication systems using the optical filter, the transmission wavelength range of the optical filter to follow up a change in the wavelength of a light source. The optical filter selectively receives a signal of a desired optical frequency from a plurality of optical frequency-multiplexed signals. Additionally, the optical filter includes a first optical filter having a transmission band characteristic with a single peak in a desired band and a half band width of a desired amount of attenuation in the transmission band equal to or smaller than about two times a channel interval of the multiplexed light signals. A second optical filter, also in the optical filter, has a periodic transmission characteristic, an odd multiplication of a half of a free spectral range of the periodic transmission characteristic being equivalent to the channel interval of the multiplexed signals. The transmission band of the first optical filter matches with a transmission peak of the second optical filter.

12 Claims, 19 Drawing Sheets

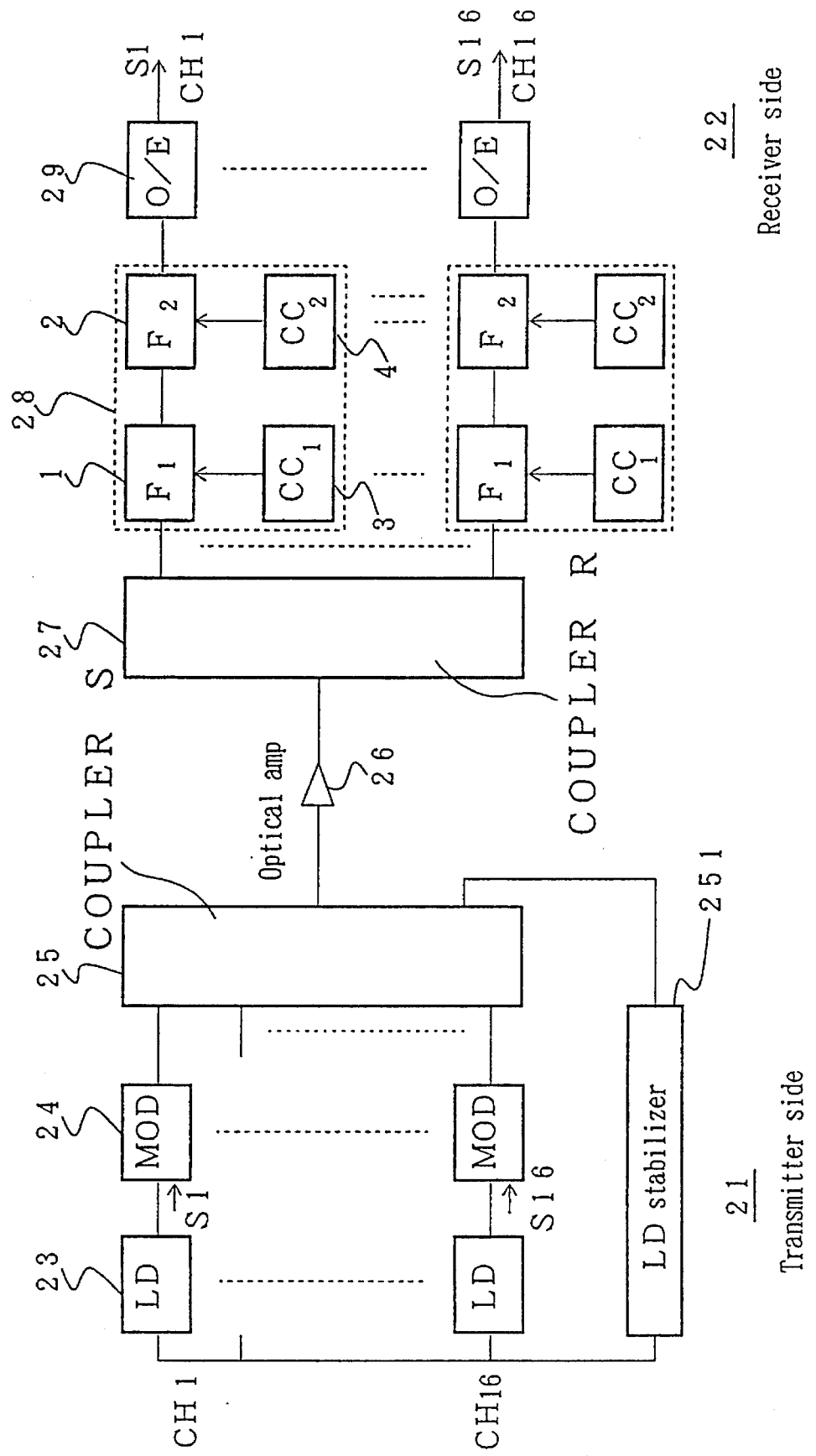

FIG. 2 (1)
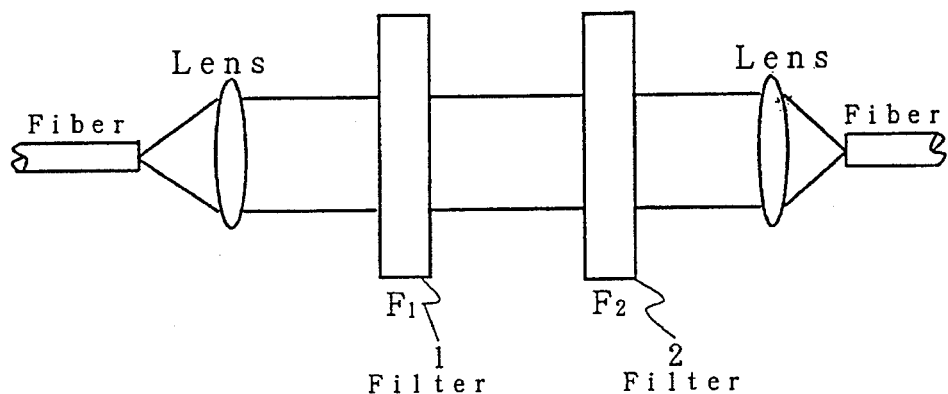
FIG.
FIG. 2 (2)
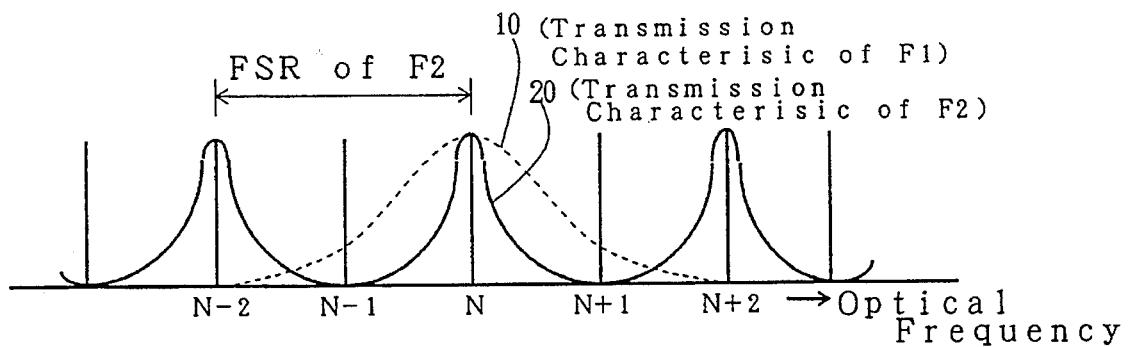

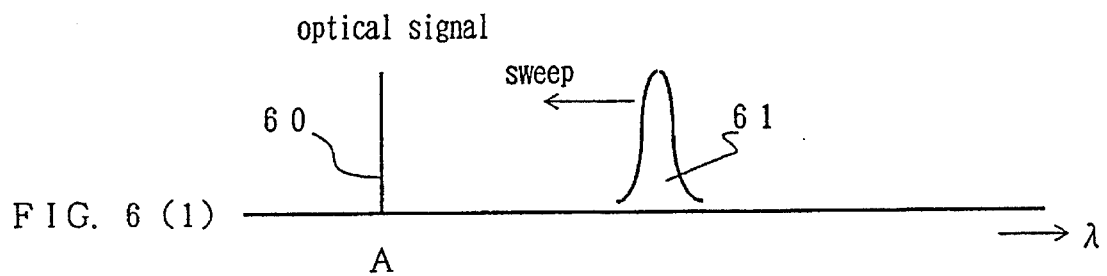
FIG. 6 (1)
FIG. 6 (2)
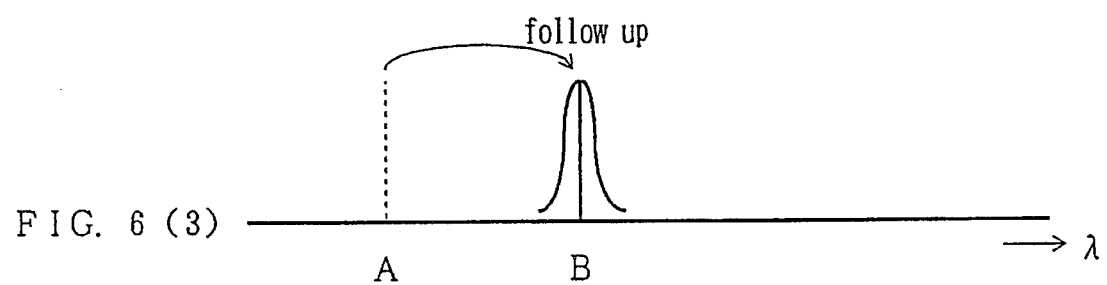
FIG. 6 (3)

FIG. 20
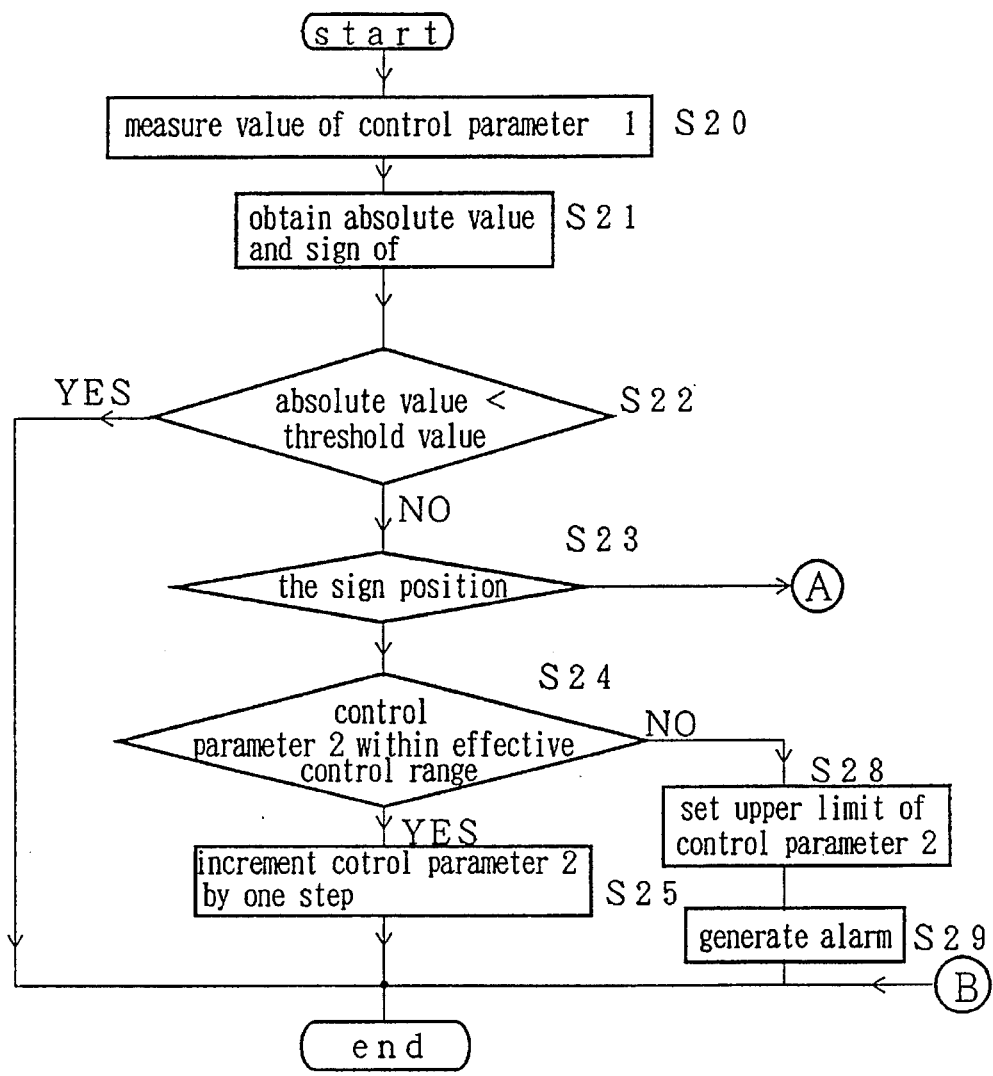
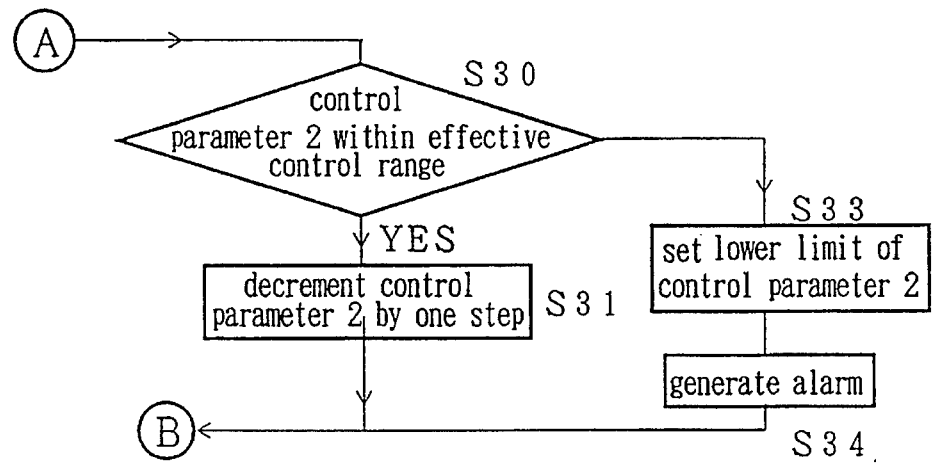

OPTICAL FILTER, METHOD OF CONTROLLING TRANSMISSION WAVELENGTH THEREOF, AND OPTICAL RECEIVER USING THE METHOD

BACKGROUND OF THE INVENTION

1. Field of the Invention

The present invention relates to an optical filter which selectively receives a signal of the desired optical frequency from a plurality of optical-frequency multiplexed light signals, a method of controlling the transmission wavelength of the optical filter, and an optical receiver using this method.

2. Description of the Related Art

Due to a recent significant increase in the amount of information, a demand exists for large-capacity communication systems. As a large-capacity communication system, an optical communication system is the most promising. The optical communication system of 2.488 Gb/s is used at present.

As the amount of information increases, optical communication systems with a larger capacity are demanded. The capacity of optical communication systems is increased by an increased transmission rate (TDM: Time Division Multiplexing), and multiplexing schemes, such as FDM (Frequency Division Multiplexing) and WDM (Wavelength Division Multiplexing).

The increase in transmission rate requires faster processing speed of electronic circuits on the transmitter and receiver sides; the limit of this speed is currently believed to be several tens of Gb/s.

The multiplexing schemes such as FDM and WDM, which use a wide band characteristic, can ensure a large capacity of several tens to several hundreds of Gb/s when used with a certain degree of improvement on the transmission rate. In addition, this system can easily execute multiplexing and separation using a photocoupler and an optical filter, reducing the burden on electronic circuits, and is thus promising.

FDM and WDM type optical receivers selectively receive a signal of a channel with the desired optical frequency from multiplexed signals. The easiest way to make that selection is to perform filtering in an optical region using an optical filter.

As there are various types of optical filters and various filter characteristics, the optical filter of a receiver should be designed to satisfy the system requirements and in consideration of practicality, simplicity, reliability, etc.

An example of the conventional wavelength multiplexing of light signals is the technique described in "Experiment on 1.55-nm Wavelength Multiplexed Transmission at 2.4 Gb/s Using An Optical fiber Amplifier" in Electronic Information Communication Committee, 1992 Spring Conference, Proceeding B-987.

This paper shows data on experiments of multiplexing two light signals with a coupler, sending the multiplexed signal to a transmission path and extracting from two filters signals from the multiplexed signal sent over the transmission path for reproduction on the receiver side.

This paper reports that the receiver could extract two signals with a wavelength interval of 8.8 nm from the respective filters with a difference of 16 dB.

As the wavelength interval in the prior art described in that paper is 8.8 nm, the disclosed art cannot be applied directly to cope with further multiplexing and further improvement on the transmission rate in the future.

Another prior art is disclosed in the magazine "Electronics Letters, 15th Mar. 1990 Vol. 26 No. 6". The second prior art concerns with optical FDM transmission of 100 channels. More specifically, this prior art multiplexes 100-channel light signals, and separates and reproduces those signals on the receiver side. The prior art has an optical filter constituted of seven stages of cascade-connected Mach-Zehnder interferometers, and employs a technique of controlling heaters provided on the respective Mach-Zehnder interferometers to tune the optical frequency to the desired level.

Although the prior art disclosed in the Electronics Letters accomplishes multiplexing and separation of 100 channels, its use of seven stages of Mach-Zehnder interferometers as an optical filter enlarges the apparatus and complicates the tuning control.

An optical filter which has a narrow-band transmission characteristic is an important element to remove ASE (Amplified Spontaneous Emission) noise from an optical amplifier besides a wavelength selecting filter in wavelength multiplexing/frequency multiplexing communication.

The narrow-band optical filter is conventionally constituted of a dielectric laminated film or a structure using an interferometers, such as a Mach-Zehnder interferometer or Fabry-Perot interferometer. Although the dielectric laminated film is structurally stable and has already been put to practice, it is difficult to attain a narrow-band transmission characteristic with a full width at half maximum of 1 nm or less.

The Fabry-Perot interferometer can easily attain a narrow-band transmission characteristic with a full width at half maximum of 1 nm or less, but is structurally unstable.

To eliminate the instability, a small Fabry-Perot interferometer using an optical fiber has been proposed. FIG. 22 shows the structure of this small Fabry-Perot interferometer using an optical fiber.

As shown in FIG. 22, the end faces of fibers are finished with mirror coating to become mirrors of high reflectivity, which are arranged with a certain gap therebetween to constitute an optical resonator. Further, PZT (Lead Zirconate Titanate) is used to control the transmission peak wavelength, thereby finely adjusting that gap. U.S. Pat. Ser. No. 4,861,136 also discloses an optical resonator with a similar structure.

This structure is relatively resistant to vibration due to its compactness and will not raise any problem when used steadily under the laboratory environment. But it has been observed that even light touching on the housing of this optical resonator greatly fluctuates the transmission peak wavelength.

Further, the adaptation of this optical resonator for use in actual communication systems is difficult because there are some doubts about its long-term reliability; for example, PZT is difficult to control due to its hysteresis, the reliability of PZT itself is not sufficient and it is difficult to stably keep the gap between the fibers with a movable portion attached.

Such unstable factors can be eliminated by a resonator constituted of a bulk member, such as quartz glass.

For example, parallel flat glass substrates may be coated with high-reflective films as shown in FIG. 23 to be used as an optical resonator. The structure shown in FIG. 23 has no movable portion so that high stability can be expected, with difficulty in controlling the transmission peak wavelength.

The narrow-band optical filter requires that the wavelength of the transmission light source should match with the transmission wavelength of the optical filter. A laser diode is generally used as the transmission light source. The laser diode also has an unstable factor.

The oscillation wavelength of the laser diode as a transmission light source has a large variation so that the wavelength probably changes due to a time-dependent change in the light source. The use of the laser diode in an optical communication system that uses a narrow-band optical filter requires automatic activation control to adjust the transmission wavelength of the optical filter to the wavelength of the transmission light source at the time the system is activated, and then cause the transmission wavelength range of the optical filter to follow up a change in the wavelength of the light source.

However, there have been no optical communication systems which use such a narrow-band optical filter or no techniques of permitting the transmission wavelength range of the optical filter to follow up a change in the wavelength of the light source.

SUMMARY OF THE INVENTION

It is therefore a primary object of the present invention to provide a novel optical filter designed to remove the bottlenecks of the conventional optical communication systems to increasing the capacity.

It is another object of this invention to provide a method of controlling the transmission wavelength of an optical filter, which method can automatically control the wavelength transmission characteristic of an optical filter in such a way as to accurately follow up a change in the wavelength of a laser diode (LD) as a light source.

It is a further object of this invention to provide an optical receiver which employs the novel optical filter and the transmission wavelength control method.

It is another object of the present invention to provide an optical filter for selectively receiving a signal of a desired optical frequency from a plurality of optical-frequency multiplexed light signals at equal intervals; comprising a first optical filter having a transmission band characteristic with a single peak in a desired band and a half band width of a desired amount of attenuation in the transmission band equal to or smaller than about two times a channel interval of the multiplexed light signals; and a second optical filter having a periodic transmission characteristic, an odd multiplication of a half of a free spectral range of the periodic transmission characteristic being equivalent to the channel interval of the multiplexed light signals, the transmission band of the first optical filter matching with a transmission peak of the second optical filter.

It is still another object of this invention to provide an optical receiver comprising an optical filter and a control circuit for altering a control parameter of a first optical filter and/or a second optical filter of the optical filter in such a way that a peak of a transmission wavelength of the first optical filter and/or the second optical filter becomes a wavelength of a desired light signal.

It is a further object of this invention to provide a method of controlling a transmission wavelength of an optical filter, comprising a step of detecting a maximum light reception input while sweeping a transmission wavelength of an optical filter, thereby fixing the transmission wavelength of the optical filter to a wavelength of the light reception input.

It is a still further object of this invention to provide an optical receiver comprising an optical filter; a control circuit for controlling a transmission wavelength of the optical filter; and a memory circuit for storing a control parameter of the optical filter, whereby the control circuit performs such control as to set a peak of the transmission wavelength of the optical filter to a wavelength of a desired light signal, fixes the transmission wavelength when a light reception input is detected and rewrites a current control parameter into the memory circuit every given time, and, when the light reception input is no longer detected, stops rewriting of the memory circuit and allows free running of the optical filter with the control parameter stored in the memory circuit until a light reception input is detected again.

It is another object of this invention to provide an optical receiver comprising an optical filter; a control circuit for altering a control parameter of the optical filter, detecting a light reception input while sweeping a transmission wavelength of the optical filter, stopping the wavelength sweeping when the light reception input has a maximum value, and fixing the transmission wavelength of the optical filter to a wavelength of the light reception input; and an automatic frequency controller for, after fixing of the transmission wavelength of the optical filter, adjusting the fixed transmission wavelength so as to follow up a change in wavelength of an oscillation source.

Other objects and advantages of the present invention will become readily apparent from the following description taken in conjunction with the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram illustrating the general structure of an optical communication system to which the present invention is applied;

FIG. 2(1) and FIG. 2(2) are conceptual diagrams for explaining the structure of an optical filter according to this invention;

FIG. 6(1), FIG. 6(2) and FIG. 6(3) are diagrams for explaining wavelength sweeping and wavelength follow-up with respect to the wavelength of an oscillation source;

FIG. 20 is a fourth flowchart for explaining the operation of wavelength control according to this invention;

DETAILED DESCRIPTION OF THE PREFERRED EMBODIMENTS

Figure 3:
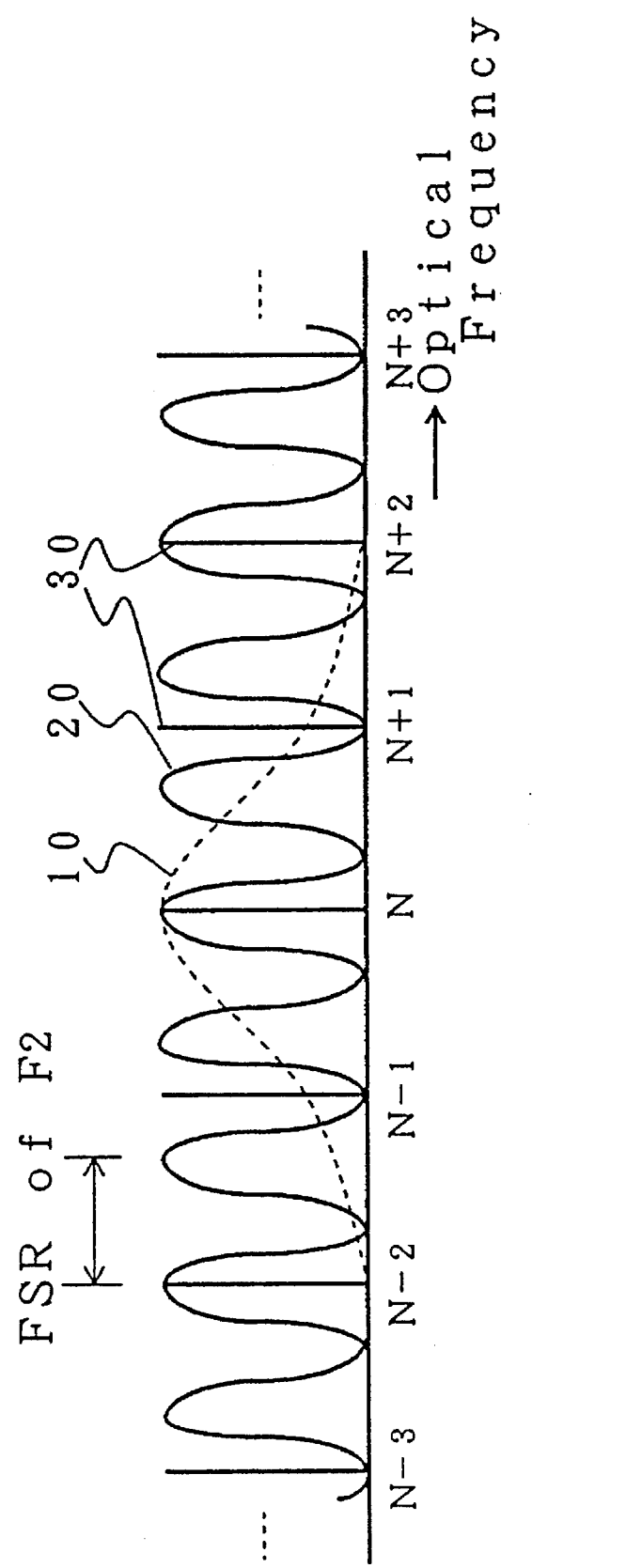
FIG. 3 is a diagram showing another example of the transmission characteristic of the optical filter structured according to this invention.

FIG. 1 is a block diagram illustrating the general structure of an optical communication system equipped with an optical receiver embodying the present invention on the receiver side.

In this embodiment, sixteen channels from channel 1 to channel 16 are wavelength multiplexed.

Accordingly, a transmitter side 21 is provided with a laser diode 23 and a modulator 24 for each of sixteen channels.

The optical outputs of the laser diodes 23 are modulated in the modulators 24 with associated channel signals S1 to S16 before being sent to a coupler 25. The coupler 25 multiplexes the outputs of the individual modulators 24 and outputs the resultant signal onto a fiber.

Part of the output of the coupler 25 is fed back to the laser diodes 23 via a laser diode (LD) stabilizer 251 to control the bias current of the laser diodes, thereby ensuring constant light-emitting power. The output of the coupler 25 is input via the fiber to a coupler 27 on a receiver side 22. An optical amplifier 26 is provided in a midway of the fiber to amplify the optical power that has been attenuated in the fiber light transmission path. The optical amplifier 26 may use an erbium (Er)-doped optical fiber.

The output of the coupler 27 of the receiver side 22 is distributed to filter circuits 28 provided in association with sixteen channels.

The received light signals, the outputs of the filter circuits 28, are sent to an O/E converters 29 to be converted from optical signals into electric signals. The electric signals are outputs as reception signals associated with sixteen channels.

The filter circuit 28 is the feature of the present invention.

While the 16 filter circuits 28 are basically the same, their transmission frequencies differ from one another. Accordingly, sixteen received light signals are de-multiplexed and extracted from the filter circuits 28.

Each filter circuit 28 has a first optical filter 1 and a second optical filter 2 as shown in FIGS. 2(1) and 2(2) which presents the conceptual diagram of the filter structure according to this invention. Those two optical filters 1 and 2 are respectively controlled by controllers 3 and 4.

Referring to FIG. 2(1), a plurality of light signals multiplexed at equal intervals, which have passed through the optical fiber, are input to the first optical filter 1. The first optical filter 1 has a single-peak transmission band characteristic in a desired band, indicated as a transmission characteristic 10 in FIG. 2(2).

The first optical filter 1 also has such a characteristic that a half band width of the desired amount of attenuation in the transmission band is equal to or smaller than about two times the channel interval 30 of the multiplexed light signals.

The second optical filter 2 has a transmission characteristic 20 with periodic peaks; the distance between adjoining peaks is called a free spectral range (FSR). The FSR is described in the aforementioned U.S. Pat. Ser. No. 4,861, 136 or Principle Optics (fourth edition) issued in 1970.

In the example shown in FIG. 2(2), the FSR of the second optical filter 2 is equivalent to the channel interval of the multiplexed light signals.

FIG. 3 shows another example of the relationship between the channel interval of the multiplexed light signals and the FSR of the second optical filter 2. That is, reference numeral "10" in FIG. 3 indicates the transmission characteristic of the first optical filter and reference numeral "20" indicates the transmission characteristic of the second optical filter as in FIG. 2(2).

The transmission characteristic 10 of the first optical filter 1 has a single peak and the half band width of the desired amount of attenuation in the transmission band is equal to or smaller than about two times the channel interval 30 of the multiplexed light signals, as shown in FIG. 3.

It is apparent from FIG. 3 that the transmission characteristic 20 of the second optical filter 2 is selected in this embodiment such that an odd multiplication of a half of the FSR, i.e., 3/2 times the FSR, is equivalent to the channel interval of the multiplexed light signals.

In the embodiment of this invention illustrated in FIGS. 1 through 3, sixteen channels are multiplexed as mentioned above, the transfer rate B is 2.5 Gb/s and the optical amplifier 26 has a band width of 30 nm.

Further the first optical filter 1 is a dielectric laminated film filter and its full width at half maximum is 0.5 nm. The second optical filter 2 has an FSR of 100 GHz and is a Fabry-Perot resonator made of quartz glass with a refraction factor of n=1.5.

With FSR=100 GHz, the resonator length L is calculated to be 1 mm from FSR=c/(2 nL). As the transmission rate B=2.5 Gb/s, the transmission band width of the second optical filter 2 (3 dB down) is about 10 GHz in consideration of the spectral range of the signal light.

Therefore, the fineness F (the ratio of FSR to the transmission band width at the 3-dB down point) becomes F=10. The channel interval when those conditions of the optical filters 1 and 2 are combined is 150 GHz.

In other words, the channel interval needs 19 dB of attenuation or greater for adjoining channels to satisfy the channel stroke. This is because if there is −19 dB leak from the adjoining two channels, the total channel stroke becomes −16 dB.

Under the condition that the necessary amount of attenuation is 19 dB or greater, the channel interval is obtained as follows.

First, (N±2)-th channels are suppressed only by the optical filter 1. Provided that the optical filter 1 has a full width at half maximum of 0.5 nm and the transmission characteristic is expressed by a Lorentz curve, the width that attenuates the transmission peak by 20 dB (it is actually 19 dB or greater, but is treated as 20 dB for simplicity) is w0.5 nm×10=5 nm.

Thus, the half band width is 5 nm÷2=2.5 nm (about 312 GHz in terms of the optical frequency).

With the channel interval being about 150 GHz, therefore, attenuation of 20 dB is provided for the channels starting from the (N±2)-th channel.

Further, (N±1)-th channels are suppressed by the combination of the optical filters 1 and 2. The (N±1)-th channels are positioned where the amount of attenuation of the optical filter 2 is the greatest. With the FSR of the optical filter 2 being 100 GHz and F=10, therefore, the amount of attenuation, CR, of the (N±1) channels provided by the optical filter 2 is given by the following equation 1.

$$CR(db) = -10 \log \{1 + 4](F/\pi) \sin(\pi S/FSR)]^2\} \quad (1)$$

where F is the fineness and S is the frequency difference to the transmission peak.

Substituting F=10 and S=FSR/2 into the equation 1 yields the following equation 2.

$$-10 \log \{1 + 4[(10/\pi) \sin (\pi/2)]\} = 16.2 \text{ (dB)} \quad (2)$$

Thus, the amount of attenuation of the (N±1)-th channels made by the optical filter 2 is 16.2 dB.

The amount of suppression of the (N±1)-th channels by the optical filter 1 is 8.3 dB as in the case of N±2.

Thus, the amount of suppression of the (N±1)-th channels by the optical filters 1 and 2 is 16.2+8.3=24.5 dB.

In short, with regard to the (N±2)-th channels, 20 dB is attenuated by the optical filter 1 and 0 dB is attenuated by the optical filter 2, thus yielding the total attenuation of 20 dB. With regard to the (N±1)-th channels, 8.3 dB is attenuated by the optical filter 1 and 16.2 dB is attenuated by the optical filter 2, thus yielding the total attenuation of 24.5 dB.

It is apparent from the above computations that it is possible to secure the necessary amount of attenuation of the channel stroke by the combination of the channel interval of 150 GHz, the optical filter 1 (full width at half maximum= 0.5 nm) and the optical filter 2 (FSR=100 GHz, F=10).

A preferable optical filter as the second optical filter 2 of the embodiment shown in FIGS. 1 through 3, is a Fabry-Perot interferometer made of silicon (Si) instead of quartz glass.

According to another modification of the filter of this invention, the second optical filter 2 may be a Fabry-Perot interferometer made of gallium arsenide (GaAs).

As Si and GaAs have a high refraction factor, which greatly depends on temperature, controlling the temperature can vary the transmission wavelength significantly. As Si or GaAs is used for the Fabry-Perot interferometer for the optical filter according to the embodiment of this invention, this embodiment has the following seven advantages.

(1) Because of a large temperature dependency of the refraction factor, the transmission wavelength can easily be adjusted by controlling the temperature.

The amount of change in transmission peak in the Fabry-Perot interferometer is given by the following equation 3.

$$\Delta f = -(C/\lambda) \cdot [\alpha + (1/n) \cdot dn/dT] \quad (3)$$

For easier understanding of the features of the optical filter embodying this invention, Table 1 below shows a comparison between the temperature sweep coefficients (GHz/°C) of quartz glass, BK-7 and Si, which are popular as the material as a Fabry-Perot interferometer. It should be noted that the values in the table are for λ=1552 nm.

The coefficient in the case of Si is equal to or greater than five times that of quartz glass, while the coefficient in the case of GaAs is equal to or greater than six times that of quartz glass.

TABLE 1

| Material | Refraction Factor | α (×10⁻⁶) | dn/dT(×10⁻⁶) | Δf(GHz/°C.) |
|---|---|---|---|---|
| quartz glass | 1.5 | 0.4 | 11.4 | −1.55 |
| BK-7 | 1.5 | 7.5 | 2.2 | −1.74 |
| Si | 3.47 | 2.5 | 135.3 | −8.0 |
| GaAs | 3.37 | 5.7 | 151.2 | −9.8 |

One fringe (FSR) of frequency change is possible by a temperature variation of about 12.5° C. when Si is used as the material, and the same is possible by a temperature variation of about 10.2° C. in the case of GaAs. (The transmission peak is periodical so that one fringe of a wavelength sweeping width is sufficient.) By way of comparison, one fringe of frequency change requires a temperature variation of about 64.5° C. for quartz glass and 57.5° C. for BK-7, and both cases are not practical.

It is easy to control the temperature of the Fabry-Perot interferometer by the accuracy of 0.01° C. Even with a large temperature coefficient of 8 to 9 GHz/°C., the center frequency of the transmission peak can be stabilized to a sufficient value of about 80 to 90 MHz.

(2) This embodiment has a high coefficient of thermal conductivity (this coefficient for Si is about 100 times that of quartz glass), and an excellent temperature sweep characteristic.

(3) This embodiment is optically isotropic and has no polarization dependency (birefringence).

(4) As this optical filter is transparent in the band of 1.3 to 1.5 μm used in optical communication, high fineness is obtained.

(5) The material is stable, is easily obtainable and is inexpensive.

(6) The material has a certain electric conductivity, so that the use of the material with a properly adjusted impurity concentration can allow the resonator itself to serve as a heater for controlling the temperature.

Figure 4:
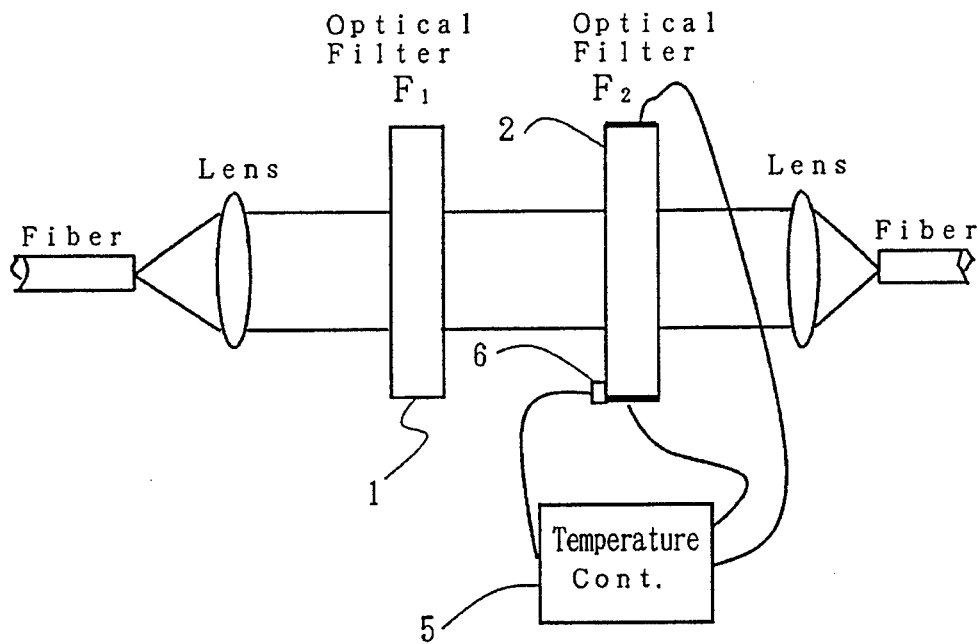
FIG. 4 is a diagram for explaining the temperature control of an optical filter.

FIG. 4 is an exemplary diagram in the case where an optical filter reflecting this feature is used as a heater to control the temperature. Electrodes are provided on the end faces of the second optical filter 2 so that a current is supplied to the optical filter 2 from a temperature controller 5.

A temperature sensor 6 detects the temperature of the optical filter 2. The temperature controller 5 compares the detected temperature with a reference temperature and controls the current in such a way as to make the temperature difference zero, thereby maintaining the temperature of the optical filter 2 at a constant level and controlling the temperature dependency of the refraction factor.

Although temperature control is performed only on the optical filter 2 in FIG. 4, temperature control on the optical filter 1 is also possible with the same structure applied to the filter 1.

Figure 5:
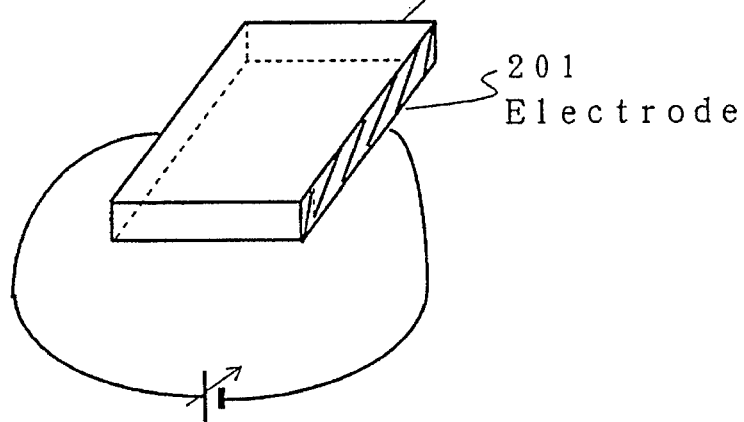
FIG. 5 illustrate the structure of filters 1 and 2 according to this invention.

While the true electric resistivity of Si is approximately 4KΩm (at the room temperature), properly adding a P type or N type dopant can yield an arbitrary resistivity. With the optical filter being 5 mm long on each side and 0.5 mm thick, for example, when electrodes 201 are formed on both ends of a silicon bulk as shown in FIG. 5 to acquire a resistance of about 5Ω, it is apparent from the relation R=ρ·1/S (R: resistance, ρ: resistivity, S: area and 1: length) that Si in use should have a resistivity of about 0.25Ωm.

Although the resistivity of Si exponentially changes with respect to temperature, this will not raise any problem if the control loop as shown in FIG. 4 is employed.

(7) Si is typically used for LSI circuits or the like, and can be processed using multifarious schemes. For example, $Si/SiO_2$ may be deposited on a transparent substrate to form a high-reflectance film mirror, and then Si may be deposited to form a resonator on which a high-reflectance film mirror of $Si/SiO_2$ is deposited. This sequence of processes eliminates the need for polishing or the like and can thus ensure mass production of optical filters.

As mentioned earlier, a narrow-band optical filter like the second optical filter 2 requires that the wavelength of the transmission light source should match with the transmission wavelength of the optical filter. As the oscillation wavelength of the transmission light source (LD) has a large variation, the wavelength will probably change due to a time-dependent change in the light source.

The practical use of an optical communication system that uses a narrow-band optical filter requires automatic activation and follow-up control to adjust the transmission wavelength of the optical filter to the wavelength of the transmission light source at the time the system is activated, and then cause the transmission wavelength range of the optical filter to follow up a change in the wavelength of the light source.

FIGS. 6(1)–6(3) present diagrams for explaining how to set the transmission wavelength of a narrow-band optical filter when such a system is activated and how to follow up a change in the wavelength of the light source.

In FIG. 6(1), to transmit a light signal 60 of a wavelength A from the light source, the transmission band 61 of the optical filter is swept to set the center of the band to the wavelength A (see FIG. 6(2)).

If the wavelength A of the light source shifts to B due to a time-dependent change in the light source, the center of the transmission band of the optical filter should be shifted to the wavelength B accordingly.

FIGS. 7 to 20 present block diagrams, a waveform diagram and flowcharts, which illustrate a control method of this invention for setting the transmission band of the optical filter at the time the system is activated and for following a change in the wavelength of the light source, exemplify the structure of an optical receiver of this invention which employs that control method, and illustrate the operational sequence.

In the following description, the same or like components will be given the same or like reference numerals or symbols.

Figure 7:
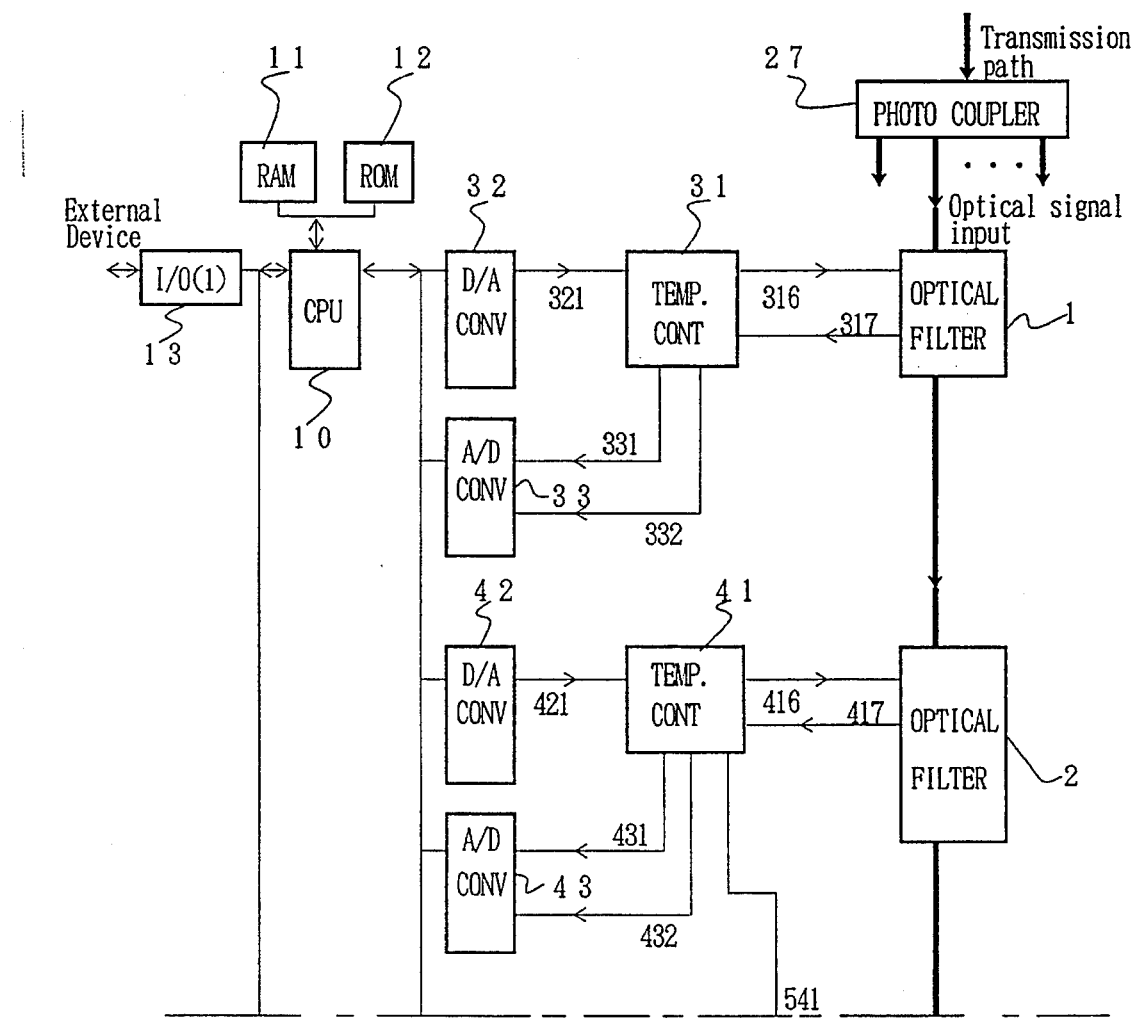
FIG. 7 is a block diagram showing a first portion of a first example of the structure of an optical receiver embodying this invention.
Figure 8:
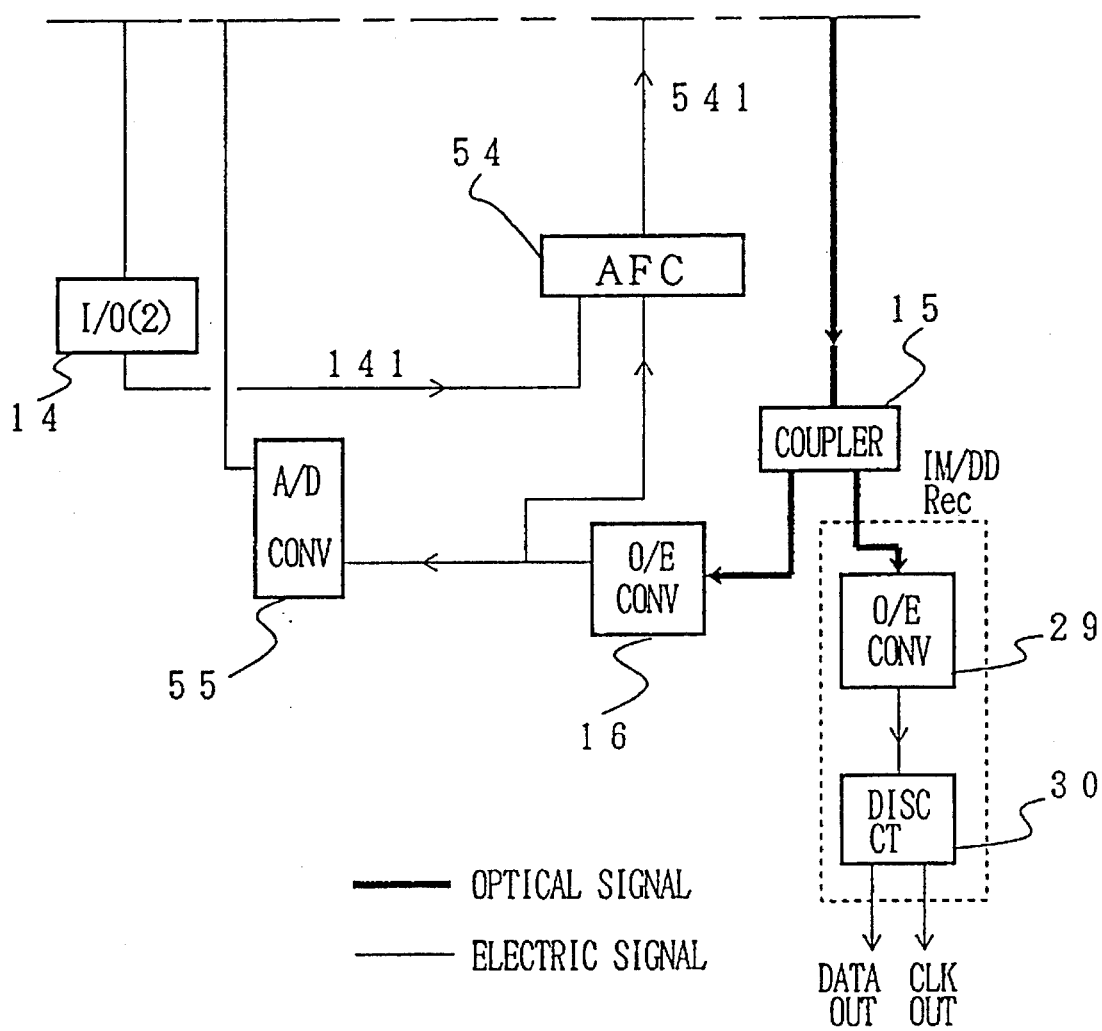
FIG. 8 is a block diagram showing a second portion of the first example of the structure of the optical receiver embodying this invention.

FIGS. 7 and 8 are block diagrams exemplifying the first structure of an optical receiver according to this invention. For the sake of diagrammatic convenience, the diagrams of FIGS. 7 and 8 are each separated into two parts (part 1) and (part 2).

As the sixteen channels explained with reference to FIG. 1 differ only in the transmission band and have the same structure, only the structure for a single channel is illustrated in FIGS. 7 and 8. Further, the thick lines indicate light signals while the thin lines indicate electric signals.

The optical signal coming over the light transmission path is distributed by the photocoupler 27 to be input to the associated first optical filter 1. The output light of the optical filter 1 is then input to the second optical filter 2.

The optical filters 1 and 2 have the transmission characteristics as explained with reference to FIGS. 2(1), 2(2) and 3, and are constituted of a module illustrated in FIG. 11. The first optical filter 1 may be, for example, constituted of a dielectric laminated film, while the second optical filter 2 is the aforementioned Si Fabry-Perot filter.

A description will now be given of the module shown in FIG. 11. An optical filter 110 is held by a metal folder 111. This folder 111 is secured on a Peltier element 114 via a stem 113. A heat slinger 115 is attached to the bottom of the Peltier element 114 to discharge heat, generated by the Peltier element 114, outside.

An input light signal from an optical fiber 118 is input as parallel light to the optical filter 110 by a lens 116. This light signal passes the optical filter 110 to be a transmitted light signal (the light whose wavelength is selected). This transmitted light signal is focused and guided again to an optical fiber 119 by a lens 117.

The light whose wavelength has not been selected by the optical filter 110 does not pass through the optical filter 110 but is reflected therefrom. To prevent the reflected light from entering the input fiber for reverse propagation, the optical filter 110 is secured with a slight inclination (several degrees) to a straight line connecting the input and output fibers 118 and 119.

A temperature sensor 112 is attached to the folder 111 holding the optical filter 110 to detect the temperature around it.

Returning to FIGS. 7 and 8, the optical signal that has passed the second optical filter 2 is distributed by a coupler 15 to be input to a main-signal receiving portion, which comprises an O/E converter 29, which converts optical signals to electric signals and a discrimination/reproduction circuit 30, and to another O/E converter 16. The O/E converter 29 receives a high-speed optical signal. The O/E converter 16 receives a low-speed optical signal for controlling the transmission wavelength of the optical filter 2 which will be described later, and for monitoring a monitor/control signal sent from the transmission side.

A temperature controller 31, a D/A converter 32 and an A/D converter 33 correspond to the controller 3 of the filter circuit 28 in FIG. 1. Connected to the temperature controller 31 are the Peltier element 114 and the temperature sensor 112 of the module of the optical filter 1 shown in FIG. 11.

Likewise, a temperature controller 41, a D/A converter 42 and an A/D converter 43 correspond to the controller 4 of the filter circuit 28 in FIG. 1. Connected to the temperature controller 41 are the Peltier element 114 and the temperature sensor 112 of the module of the optical filter 2 shown in FIG. 11.

Figure 11:
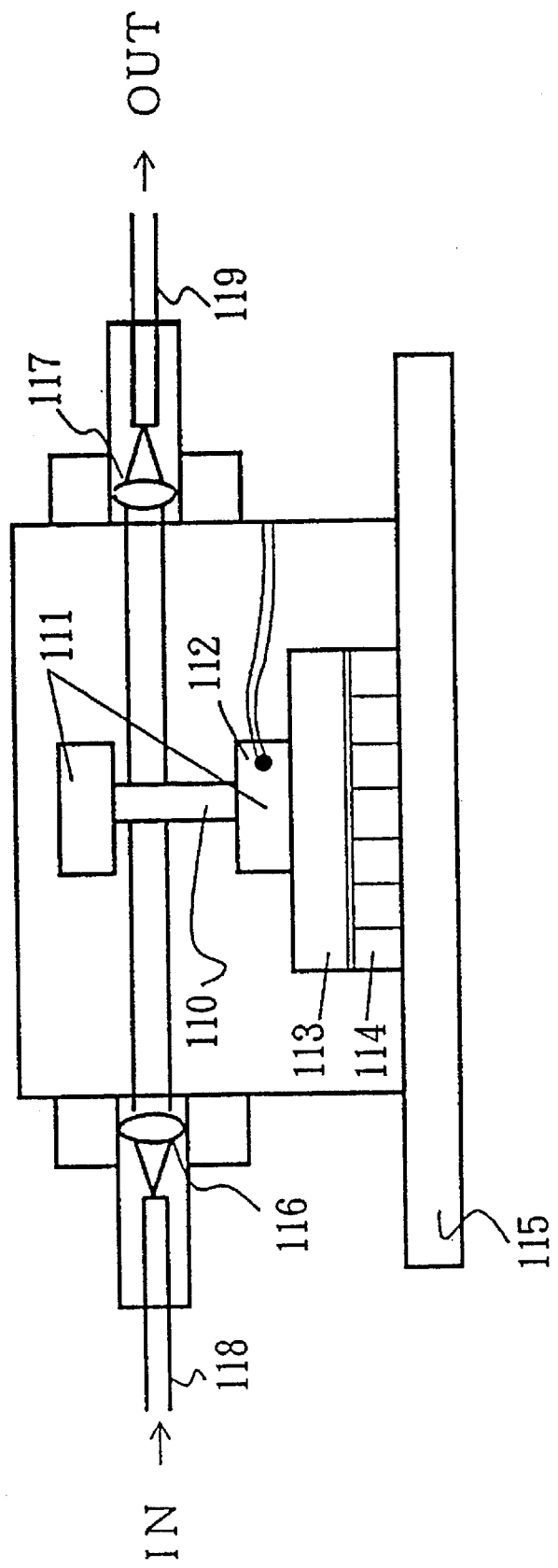
FIG. 11 is a diagram for explaining a module structure of an optical filter according to this invention.

Instead of the module structure shown in FIG. 11, a current may be permitted to flow through the Fabry-Perot resonator made of silicon (Si) to generate heat, thereby executing temperature control. Further, means for measuring the electric resistance of the Fabry-Perot resonator may be provided as temperature measuring means in place of the temperature sensor 112 to thereby perform temperature control on the Fabry-Perot resonator.

Figure 12:
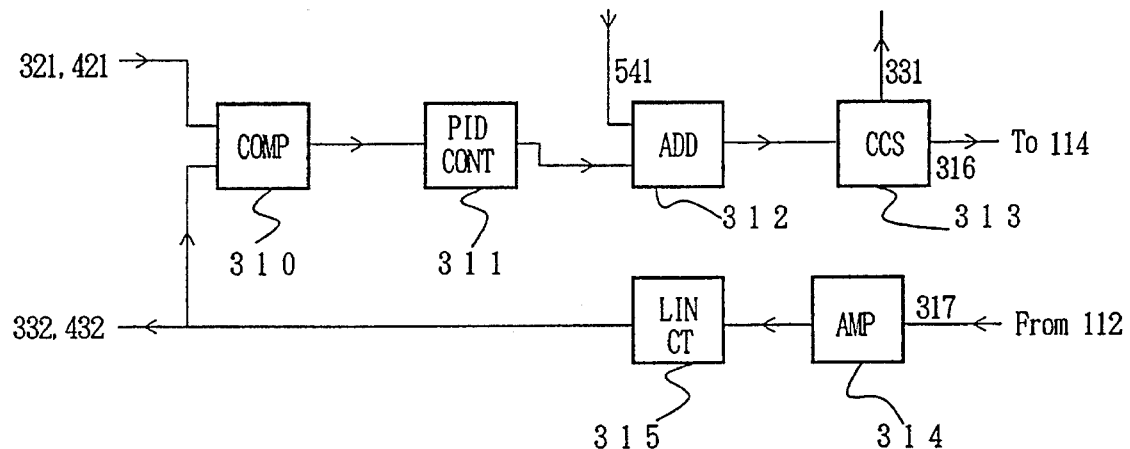
FIG. 12 is a block diagram exemplifying the structures of temperature controllers 31 and 41.

FIG. 12 presents a block diagram exemplifying the structure common to the temperature controllers 31 and 41. A comparator 310 compares a set-temperature control voltage 321, 421 from the D/A converter 32 or 42 with a control temperature monitor signal input 332, 432 to the A/D converter 33 or 43 and outputs a signal corresponding to the difference.

A PID controller 311 performs phase compensation on the output signal of the comparator 310 in accordance with the frequency response of the system. The phase-compensated signal is input to one terminal of an adder 312. The adder 312 in the temperature controller 41 receives a synthesized signal 541 of "AFC error signal+low-frequency modulation signal" at the other terminal and adds this synthesized signal to the output of the PID controller 311.

The synthesized signal 541 of "AFC error signal+low-frequency modulation signal" for the adder 312 is used for feedback control of the temperature control signal for the optical filter 2. In the temperature controller 31 which does not use this synthesized signal 541 of "AFC error signal+ low-frequency modulation signal," the terminal of the adder 312 which corresponds to the synthesized-signal input terminal of the adder 312 in the temperature controller 41 is connected to the ground (GND).

The output of the adder 312 is converted into a current of a level corresponding to the level of that output. The Peltier element 114 of the optical filter module (FIG. 11) is driven by that current. The detection signal from the temperature sensor 112 of the optical filter module is amplified by an amplifier 314. The amplified signal is then sent through a linearizer 315 to be a control temperature monitor signal 332 or 432 that is to be input to the A/D converter 33 or 43.

Returning again to FIGS. 7 and 8, the temperature controller 31 causes a Peltier drive current 316 to flow through the Peltier element 114 to control the temperature of the optical filter 1 to the temperature corresponding to the set-temperature control voltage 321 from the D/A converter 32. As a result, the temperature of the optical filter 1 is kept at a predetermined temperature, and the transmission wavelength is also kept at a predetermined value.

The output of the temperature sensor 112 is input as the control temperature monitor signal 331 to the A/D converter 33 under the control of the temperature controller 31. Part of the Peltier element drive current from a constant current source 313 of the temperature controller 31 is supplied as the monitor current 331 to the A/D converter 33. The output of the A/D converter 33 is input to a CPU 10 to monitor the temperature control status.

Likewise, the temperature controller 41 causes the Peltier drive current to flow through the Peltier element 114 to control the temperature of the optical filter 2 to the temperature corresponding to the set-temperature control voltage 421 from the D/A converter 42. As a result, the temperature of the optical filter 2 is kept at a predetermined temperature, and the transmission wavelength is also kept at a predetermined value.

The output 417 of the temperature sensor 112 is input as the control temperature monitor signal 432 to the A/D converter 43 under the control of the temperature controller 41. Part of the Peltier element drive current 416 from the constant current source 313 of the temperature controller 41 is supplied as the monitor current 432 to the A/D converter 43. The output of the A/D converter 43 is input to the CPU 10 to monitor the temperature control status.

The CPU 10 controls the transmission wavelengths of the optical filters 1 and 2. A ROM 12 is a non-volatile memory which stores a control sequence program that is executed by the CPU 10. A RAM 11 is a memory for temporary storage where data or the like necessary for the control operation is set.

An I/O 13 is an input/output portion which informs an external monitor device (not shown) of the operation status of the receiver or sets the operation status of the monitor device in response to a request from the monitor device.

Although the CPU 10 is connected to the ROM 12, RAM 11, D/A converters 32 and 42 and the I/O 13 by separate buses, it is more preferable that they are connected together by a common bus.

Further, in FIG. 8, an A/D converter 55 performs A/D conversion on an electric signal corresponding to the low-speed optical signal for controlling the transmission wavelength of the optical filter 2 or monitoring the monitor/ control signal sent from the receiver side, and inputs the digital signal to the CPU 10.

An I/O 14 is an input/output port which enables or disables the input of an AFC error signal in response to a control signal from an external device. (The I/O 14 needs just one bit as it conducts the ON/OFF control of the switch of an automatic frequency controller (AFC) 54.) This port I/O 14 is used for automatic activation control of the optical filter or the like, which will be described later.

The I/O 14, AFC 54 and O/E converter 16 constitute an AFC system, which detects a shift of the oscillation wavelength (frequency) of the transmission light source (laser diode) from the center of the transmission wavelength (frequency) of the optical filter 2 and performs feedback control to make the shift to zero.

Figure 13:
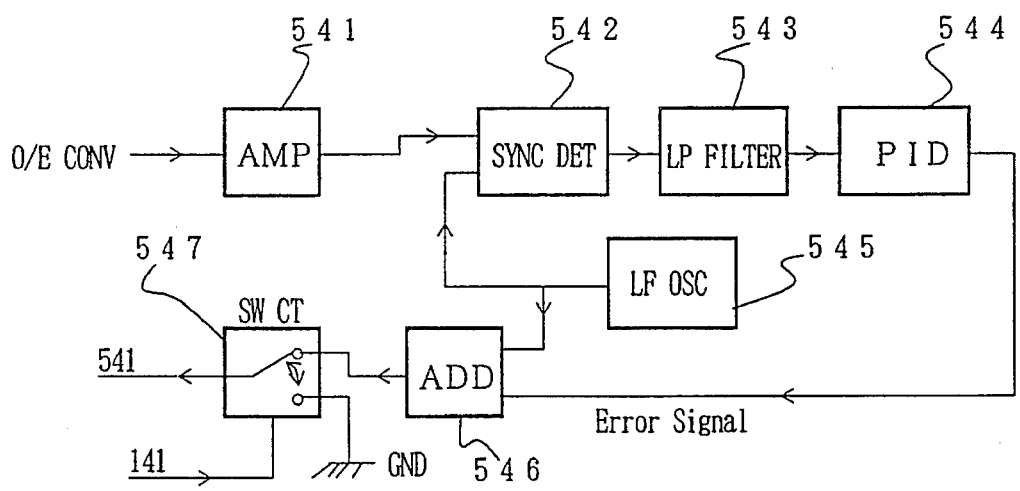
FIG. 13 is a block diagram exemplifying the structure of an automatic frequency controller (AFC) 54.
Figure 14:
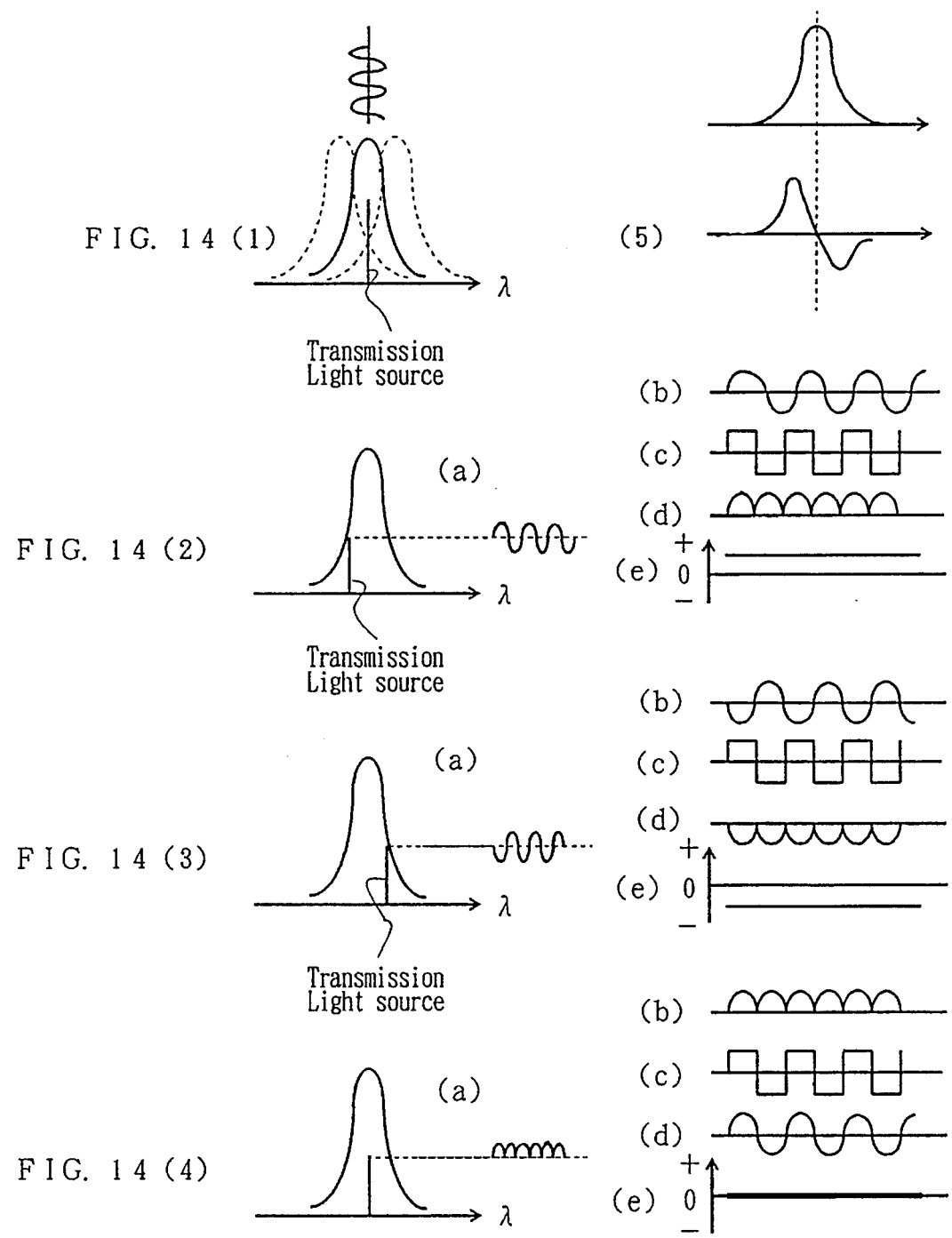
FIGS. 14(1) through 14(5) are diagrams for explaining the AFC operation of the AFC

FIG. 13 exemplifies the structure of the AFC 54. The AFC 54 comprises an amplifier 541, a sync detector 542, a low-pass filter 543, a PID circuit 544, a low-frequency oscillator 545, an adder 546 and a switch circuit 547. FIGS. 14(1)–14(4) are diagrams for explaining the automatic frequency control.

The switch circuit 547 is set on or off by the AFC ON/OFF control signal 141 sent via the I/O 14. When the switch circuit 547 is set on, the adder 546 adds the signal from the low-frequency oscillator 545 to the error signal, and sends the resultant signal 541 to the adder 312 (see FIG. 12) of the temperature controller 42 to control the optical filter 2.

Accordingly, the transmission wavelength of the optical filter 2 is changed finely by the signal frequency from the low-frequency oscillator 545 (see FIG. 14(1)). If the center of the transmission wavelength shifts from the wavelength of the signal light as indicated by (a) in FIG. 14(2), a signal, intensity-modulated by the left-hand slope of the transmission wavelength of the optical filter 2, is obtained as indicated by (b) in FIG. 14(2). If the shift occurs on the opposite side as indicated by (a) in FIG. 14(3), a signal ((b) in FIG. 14(3)), intensity-modulated in the opposite phase as that of the signal (b) in FIG. 14(2) by the left-hand slope of the transmission wavelength of the optical filter 2, is obtained as indicated by (b) in FIG. 14(3).

When the center of the transmission wavelength of the optical filter 2 matches with the wavelength of the transmitted light (see (a) in FIG. 14(4)), a full-wane rectified intensity-modulated signal, as indicated by (b) in FIG. 14(4), is yielded due to the influence of the right-hand and left-hand slopes of the transmission wavelength of the optical filter 2.

The yielded intensity-modulated signal in each case and the signal from the oscillator 545 are subjected to sync detection (equivalent to multiplication). For easier understanding, the signal from the low-frequency oscillator 545 is converted into a rectangular wave. The multiplication is executed after phase adjustment is conducted by a phase adjuster (not shown) in such a way as to match the rising of this rectangular wave with the zero-crossing point of the detection signal. The PID circuit 544 performs phase compensation on the entire system.

In the case of FIG. 14(2), therefore, the signal (b) and the rectangular wave (c) have the same sign in any half period, and are multiplied by each other, so that the output of the sync detector 542 is positive at any point of time ((d) in FIG. 14(2)). This signal is supplied to the low-pass filter 543 to remove the unnecessary high-frequency component, yielding an error signal.

In the case of FIG. 14(3), as the signal (b) and the rectangular wave (c) have different signs in any half period, the output of the sync detector 542, which has been derived from the multiplication of the former two signals, is negative at any point of time ((d) in FIG. 14(3)). This output, after passing the low-pass filter 543, becomes a negative error signal ((e) in FIG. 14(3)).

In the case of FIG. 14(4), the output of the sync detector 542 becomes a wave which changes its sign every half period but with the equal amplitude. This output, after passing through the low-pass filter 543, becomes zero ((e) in FIG. 14(4)).

As described above, when a low-frequency signal is superimposed on the temperature control voltage of the optical filter 2, the detection signal and the original low-frequency signal are subjected to sync detection with a proper phase relation and the resultant signal is put through the low-pass filter 543, the above-described error signal according to each case is acquired. Since the zero-crossing point of this error signal matches with the peak of the transmission wavelength of the optical filter 2 (the sync-detected output is the first derivative of the signal from the optical filter 2; see FIG. 14(5)), the wavelength of the optical filter 2 can be controlled using the error signal.

The problem of this method is that as a low-frequency signal is superimposed on the temperature control voltage to forcibly alter the wavelength of the optical filter 2, affecting the main signal, this method cannot follow up a change having a frequency higher than that of the low-frequency signal.

Therefore, the modulation index of the low-frequency signal (modulation depth=amplitude) is set in such a range that the deterioration of the main signal does not matter and that a sufficient SN ratio of the control signal of the optical filter is attained. (The greater the amplitude is, the better the SN ratio of the error signal becomes.) The modulation frequency is set to a frequency which is sufficiently higher than the expected change and to which the optical filter or electric circuits respond sufficiently.

Figure 9:
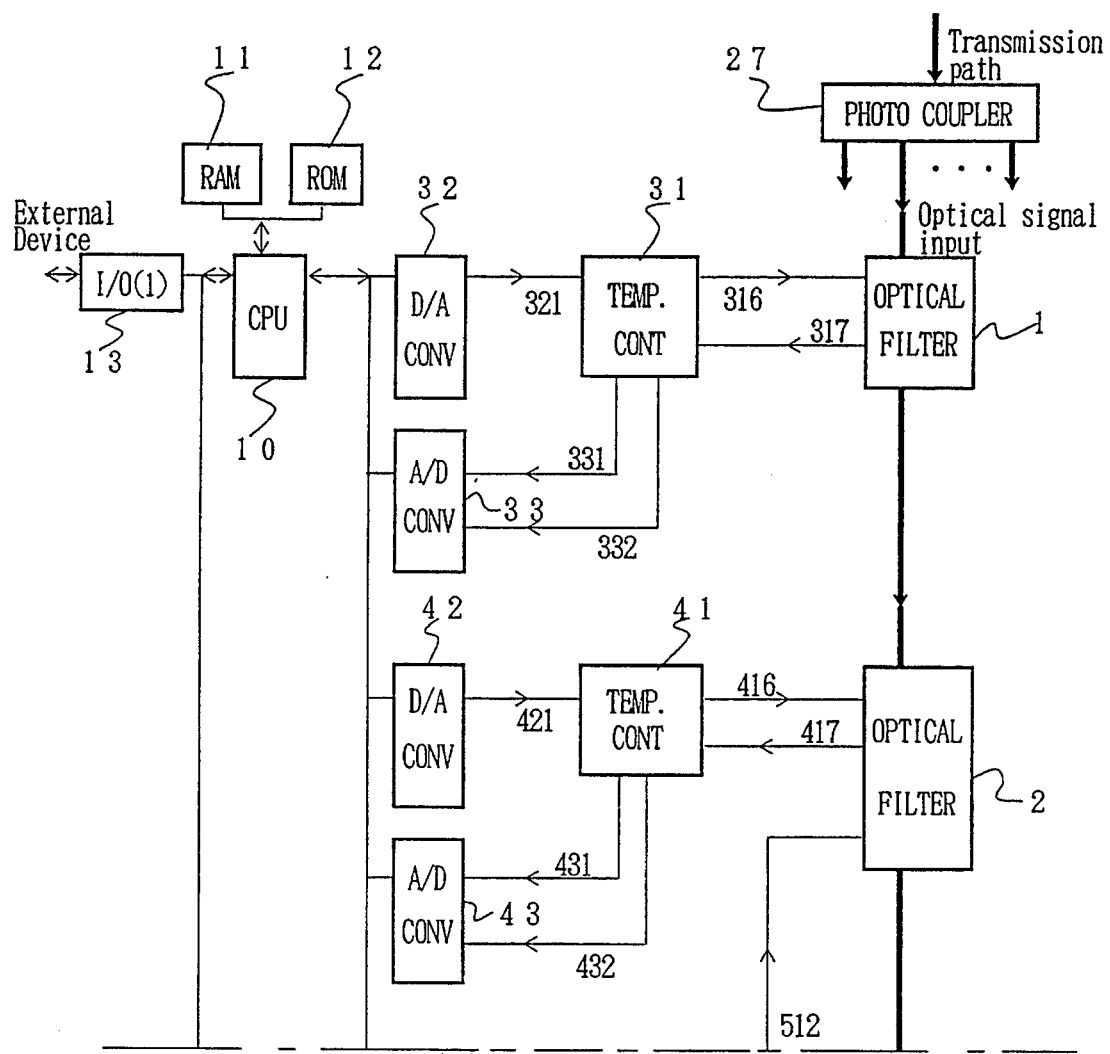
FIG. 9 is a block diagram showing a first portion of a second example of the structure of the optical receiver embodying this invention.
Figure 10:
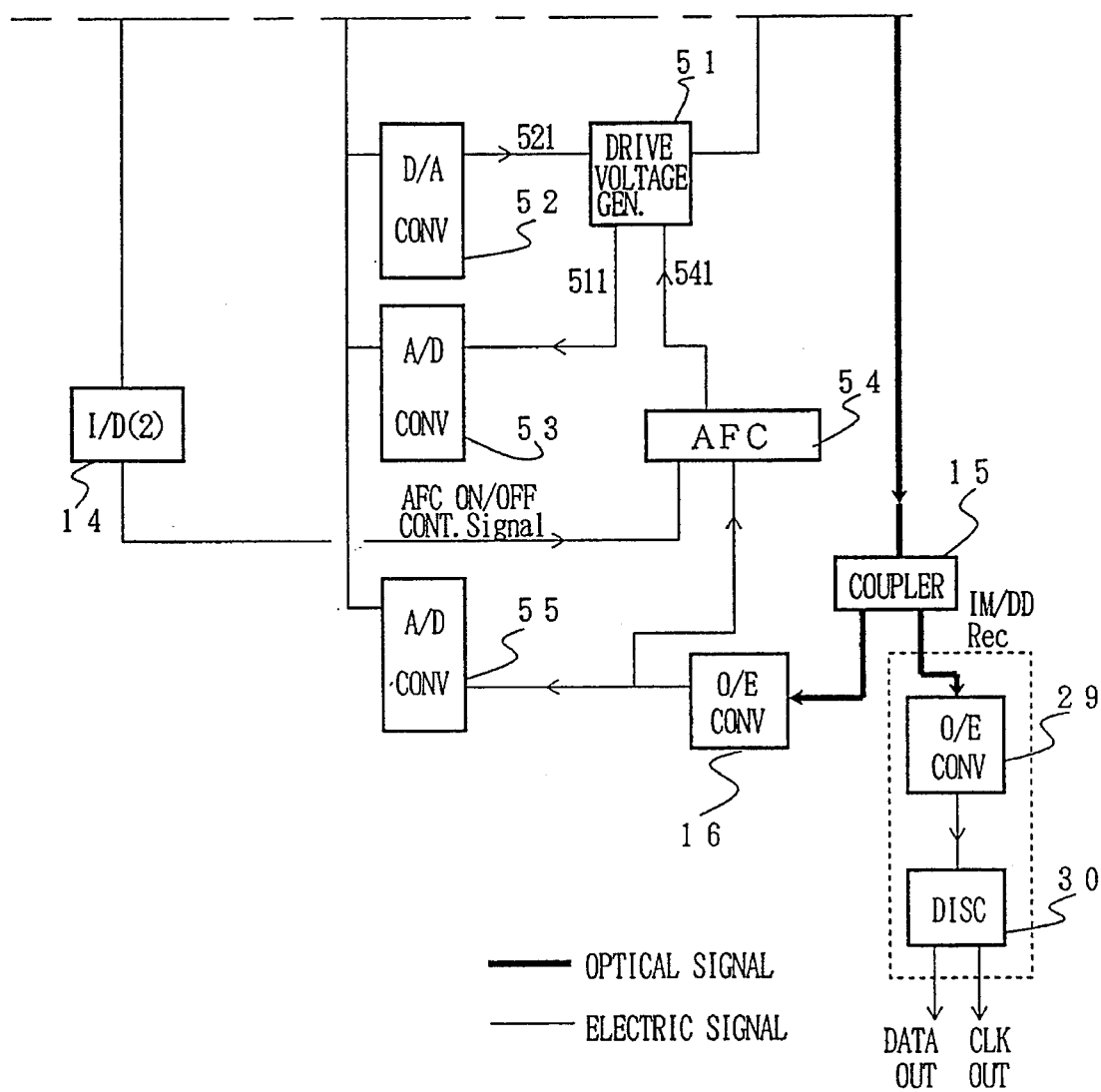
FIG. 10 is a block diagram showing a second portion of the second example of the structure of the optical receiver embodying this invention.

FIGS. 9 and 10 are block diagrams exemplifying the second structure of the optical receiver. For the sake of diagrammatic convenience, the diagrams of FIGS. 9 and 10, like those of FIGS. 7 and 8, are each separated into two parts (part 1) and (part 2).

The second structure of the optical receiver shown in FIGS. 9 and 10 is basically the same as the first structure and the difference lines in that the feedback portion of the AFC are so designed as not to lead the temperature of the optical filter 2 to the controller but to voltage-control the optical filter 2.

For the voltage control, this optical receiver is equipped with a drive voltage generator 51, a D/A converter 52 and an A/D converter 53. The D/A converter 52 and A/D converter 53, like the other converters 32, etc., are connected to the CPU 10.

Figure 15:
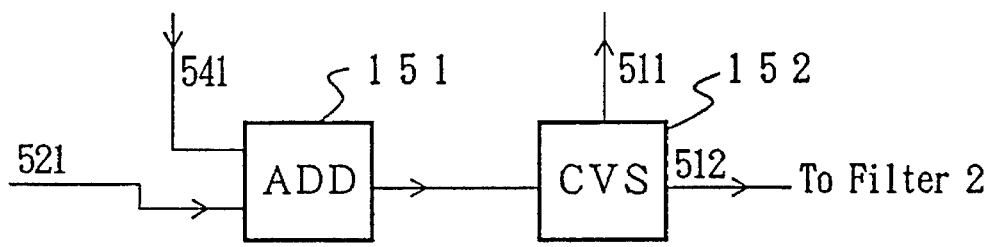
FIG. 15 is a block diagram exemplifying the structure of a drive voltage generator 51.

FIG. 15 illustrates an example of the structure of the drive voltage generator 51 which has an adder 151 and a constant voltage source 152. The adder 151 receives the drive control voltage 521 from the D/A converter 52 and the "AFC error signal low-frequency modulation signal" 541 from the AFC 54. The adder 151 adds those input signals together and outputs the resultant signal.

The output of the adder 151 drives the constant voltage source 152 to generate a voltage associated with that output. The voltage output of the constant voltage source 152 is input to the A/D converter 53 as a drive voltage monitor signal 511 and is also supplied to the optical filter 2 as a drive signal 512. The transmission wavelength of the optical filter 2 is controlled in accordance with the received voltage.

Figure 16:
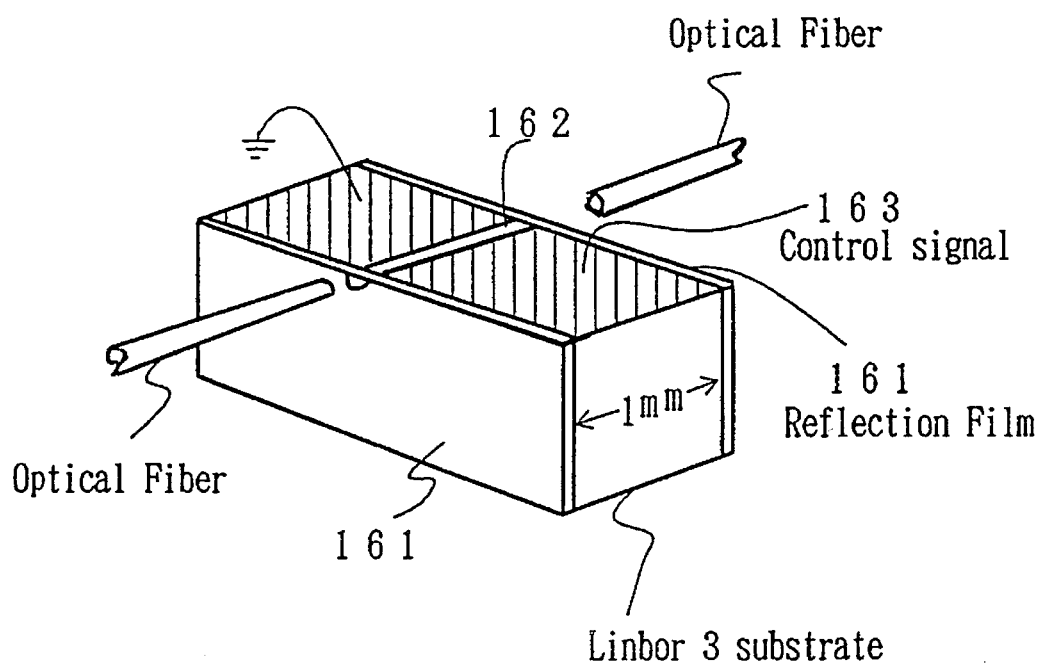
FIG. 16 is a block diagram exemplifying the structure of a voltage-driven optical filter.

FIG. 16 illustrates an example of the structure of the optical filter which is so designed that its transmission wavelength can be controlled by the voltage. This optical filter may be a Fabry-Perot variable wavelength filter introduced in Electronic Communication Committee, 1991 Spring National Conference, Proceeding B-494.

In FIG. 16, a reflection film 161 is formed on both sides of an LiNOb3 substrate, constituting a resonator. Further, an optical waveguide 162 is formed as illustrated, and a control voltage 163 is applied to the electrodes which are so provided as to sandwich the optical waveguide 162.

FIGS. 17 through 20 show operational flowcharts according to the method of this invention for controlling the transmission wavelength of the optical filter 2 in the first and second structures of the optical receiver, which have already been described above, in order to cope with a change in the wavelength of the signal source (laser diode) on the transmitter side.

More specifically, the operational flowcharts illustrate operational sequences to control the transmission wavelength of the optical filter 2 to match with the wavelength of the transmission light source at the time the communication system is activated, and to cause the transmission wavelength of the optical filter 2 to follow up a change in the wavelength of the light source.

The control operations are not limited to the case where the optical filter in the optical receiver shown in FIGS. 7 to 10 is controlled according to this invention, but may be applied to the case where the transmission wavelength of an ordinary optical filter in an optical receiver is controlled.

Figure 17:
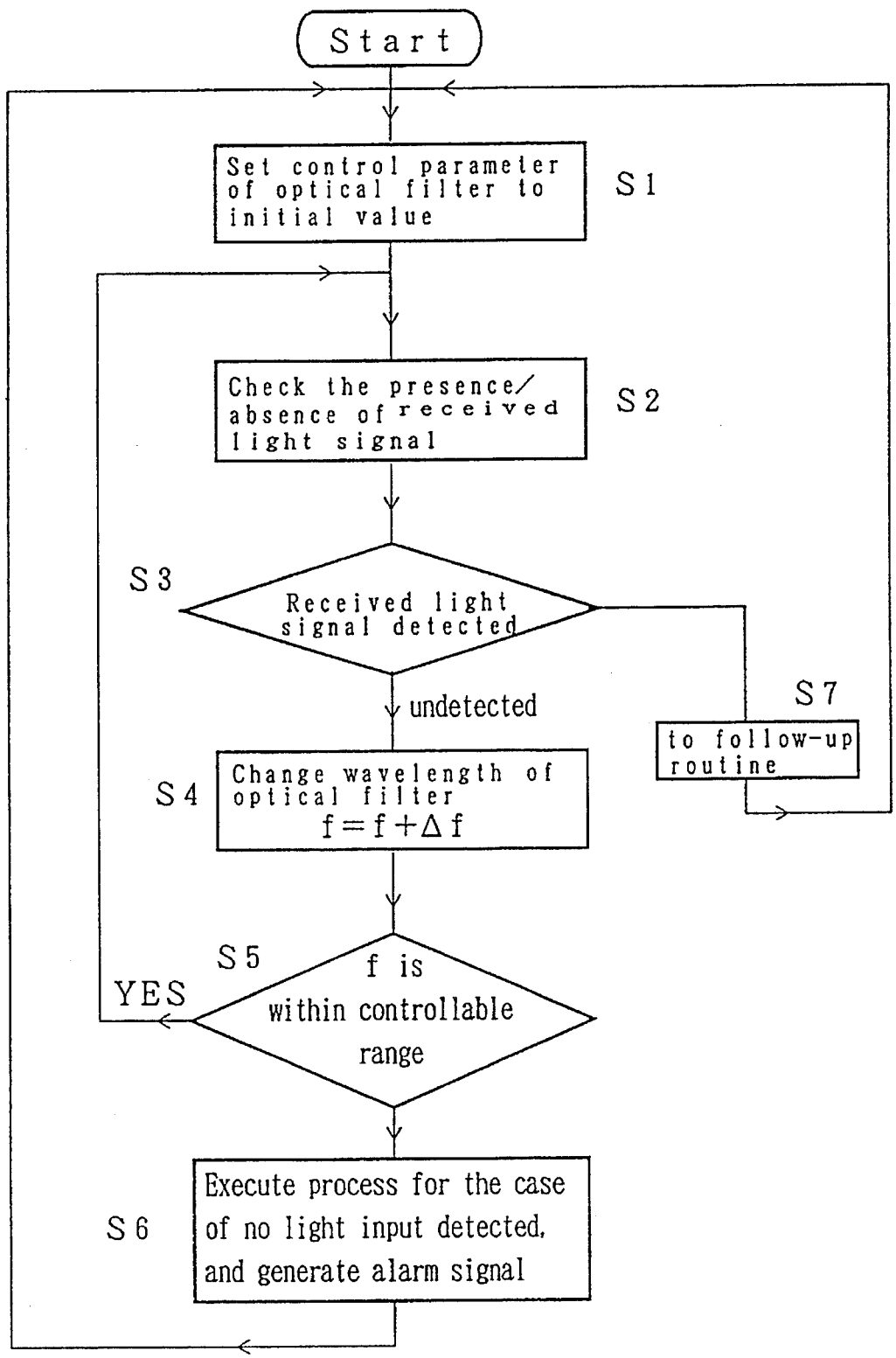
FIG. 17 is a first flowchart for explaining the operation of wavelength control according to this invention.

FIG. 17 presents an operational flowchart for automatic activation control according to this invention.

The control program associated with the operational flowchart, which will be described below, is stored in advance in the ROM 12 in FIGS. 7 and 9, as the control sequence of the CPU 10. At the time of activation, therefore, the CPU 10 loads this program from the ROM 12 and executes a certain process.

Returning to FIG. 17, first, the control parameter of the optical filter is set to the initial value (step S1).

In this initialization, first, in accordance with the wavelength of the transmission oscillation source (laser diode) the associated temperature is selected so that the transmission wavelengths of the optical filters 1 and 2 become predetermined values. The CPU 10 sends signals via the D/A converters 32 and 42 to the temperature controllers 31 and respectively, to set the temperatures of the optical filters 1 and 2 to the selected temperatures.

Then, it is checked if there is a received light signal (step S2).

When the initial transmission wavelengths of the optical filters 1 and 2 match with the wavelength of the oscillation source (laser diode), the outputs of the A/D converters 33 and 43 are input to the CPU 10. The CPU 10 checks those inputs to determine if there is a received optical signal (step S3).

When there is a received optical signal, the CPU 10 enters a follow-up control routine (step S7).

In the follow-up control routine (step S7), the CPU 10 loads a follow-up control program, a subprogram of the processing program, from the ROM 12 and performs control according to the loaded program.

The CPU 10 receives digital signals from the A/D converters 33 and 43, which correspond to the optical input. The CPU 10 determines how the wavelength of the transmission oscillation source is changed, from the level of the light input received as the digital signals.

To follow up a change in the wavelength of the transmission oscillation source, the CPU sends a signal corresponding to a new control amount to the temperature controller 41 via the D/A converter 42 to shift the transmission wavelength of the optical filter 2, as has been described with reference to FIG. 6(3).

Only the transmission wavelength of the optical filter 2 is controlled because the optical filter 1 is a filter of a dielectric laminated film, giving a small allowance for a change in the transmission wavelength as has already described referring to FIGS. 2(1) and 2(2), while the optical filter 2 is a Fabry-Perot resonator whose transmission wavelength can be controlled easily.

The follow-up control is executed in the above manner. When the signal corresponding to the optical input is no longer output from the A/D converter 43 during the follow-up control, the CPU 10 detects this event and returns to the setting of the initial values (step S1). This is because that the wavelength of the transmission oscillation source has changed beyond the allowable range of the follow-up control.

Returning again to FIG. 17, if no received optical signal is detected in step S3, sweep control is then performed to change the wavelength of the optical filter ΔF by ΔF (step S4).

In other words, as the initial transmission wavelength of the optical filter 2 does not match with the wavelength of the transmission oscillation source, sweeping is performed to find the wavelength of the oscillation source while changing the transmission wavelength of the optical filter 2f by ΔF, as has been described with reference to FIGS. 6(1) and 6(2).

The CPU 10 acquires the amount of control to change ΔF and determine if this amount falls within a controllable range for the optical filter 2 (step S5).

If the control amount is in the controllable range, the CPU 10 causes the temperature controller 41 to change the wavelength of the optical filter 2 by ΔF and repeats sweeping until the optical input is detected (step S3).

If no optical input is detected even through the repetitive sweeping and the control amount goes beyond the controllable range, the CPU 10 performs a process for the case where no optical input has been detected and generates an alarm signal (step S6).

Figure 18:
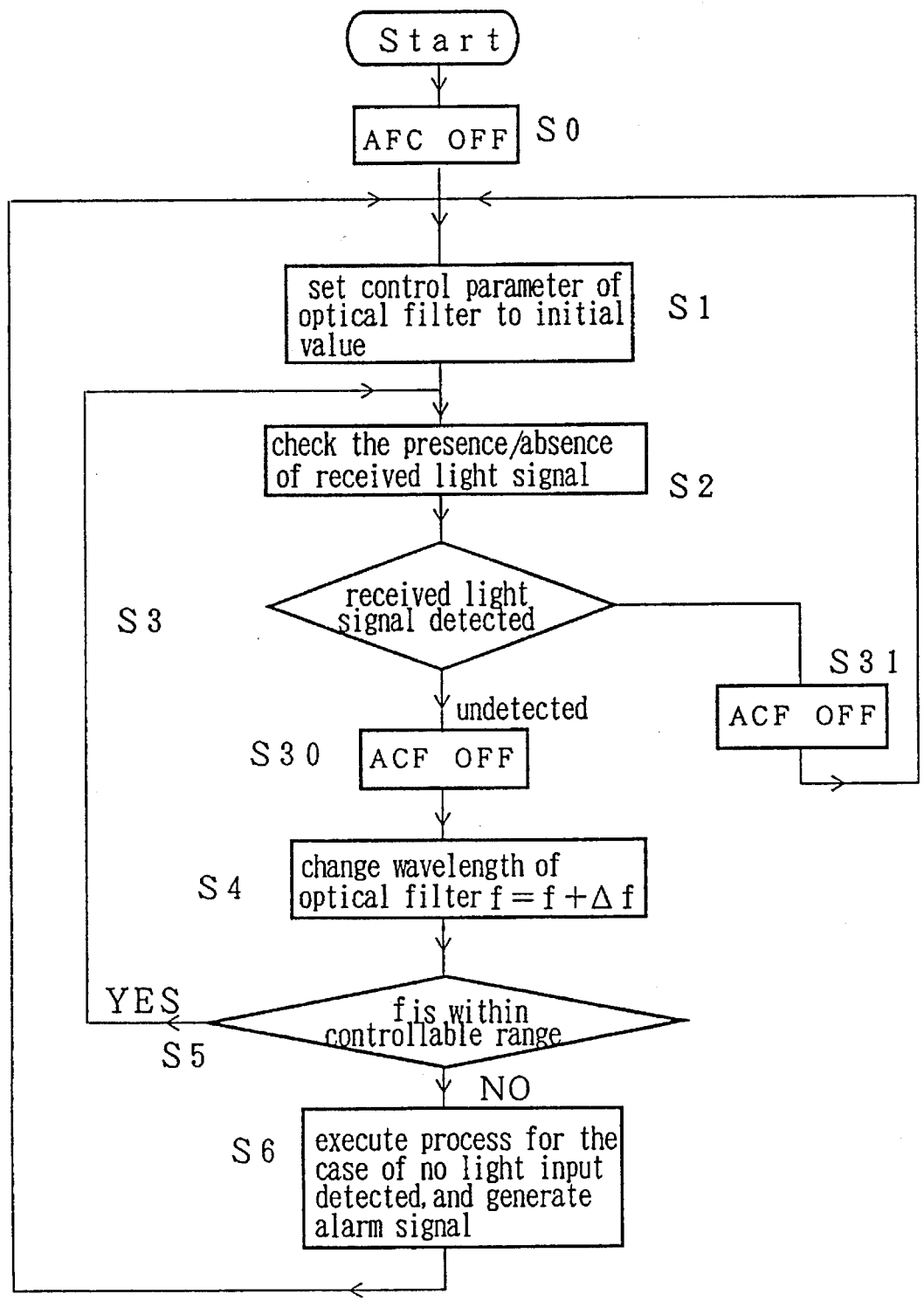
FIG. 18 is a second flowchart for explaining the operation of wavelength control according to this invention.

FIG. 18 is an operational flowchart for executing the follow-up control routine by hardware. That is, the operation is controlled to carry out automatic frequency control (step S31) instead of the follow-up routine (step S7) shown in FIG. 17.

This control is possible by sending an AFC enable control signal via the I/O 14 to the AFC 54 and setting the switch circuit 547 (FIG. 13) on in FIGS. 7 and 9. In other words, when the optical input is detected in step S3 of the flowchart of FIG. 18, a control signal to enable AFC is sent to the I/O 14 from an external monitor device (not shown).

When the switch circuit 547 is set on, the transmission wavelength of the optical filter 2 is controlled to follow up a change in the wavelength of the oscillation source under the feedback control that has been discussed in the description of the AFC 54 referring to FIGS. 13 and 14(1)–14(5).

In the case where the control parameter for changing the transmission wavelength of the optical filter can be changed promptly, if intermission of the received optical signal occurs due to system exchange or the interruption and coupling of the optical signal for examination of the characteristic, an operator can be given the same operability as that of an ordinary system without noticing the automatic activation control by permitting fast looping of the above-described control routine.

In the case where the control parameter of the optical filter cannot be changed quickly, like temperature, once the optical signal is interrupted even instantaneously, the automatic activation control is executed each time, so that maintenance of the system is likely to take time unnecessarily.

Suppose that it takes one minute to sweep the entire wavelength-variable region of the optical filter at the time of automatic activation control. Even with light interruption for several seconds for measurement, maintenance or the like, the operator should wait nearly one minute until the received optical signal is recovered.

Figure 19:
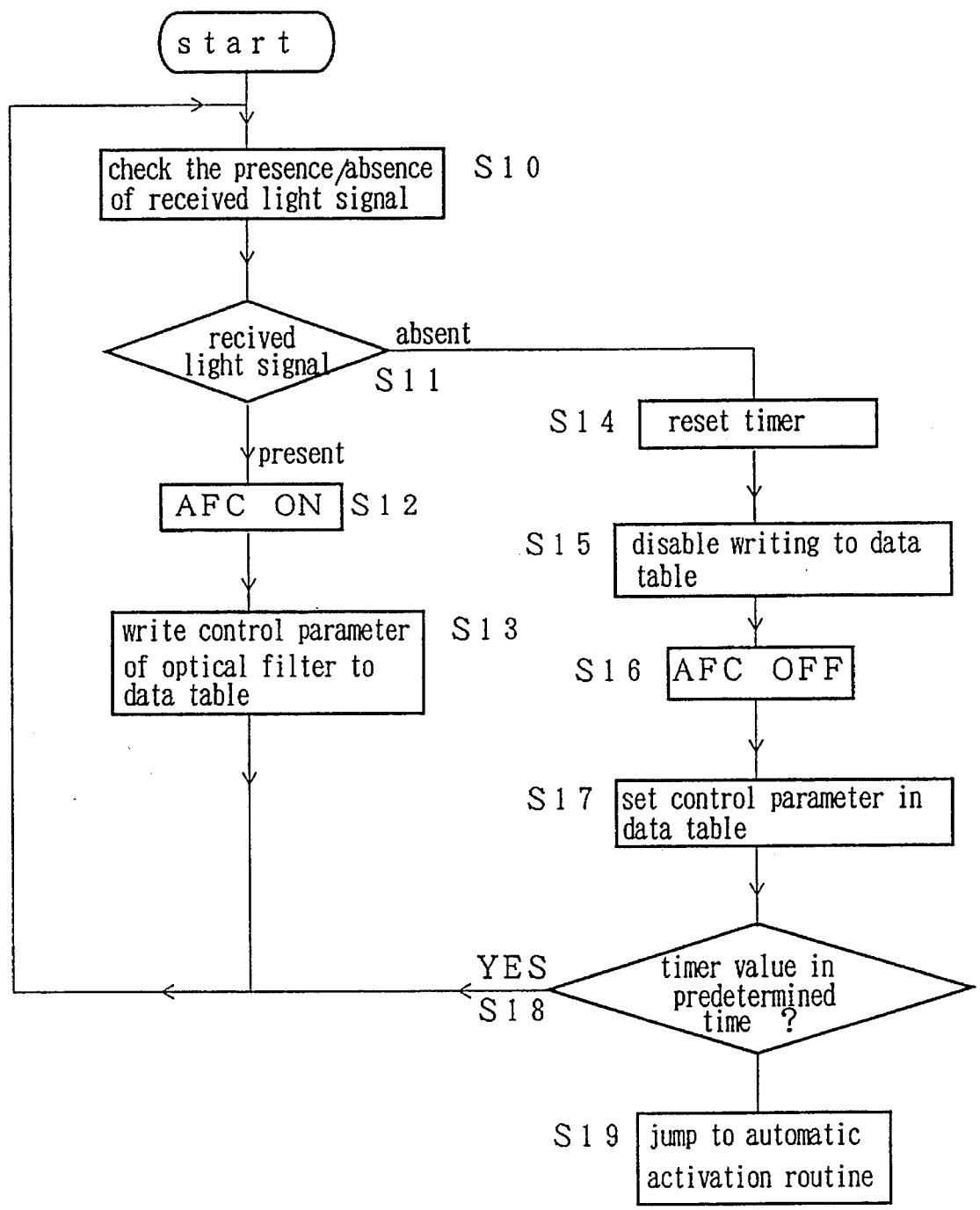
FIG. 19 is a third flowchart for explaining the operation of wavelength control according to this invention.

This problem can be overcome by performing the operational sequence in such a way that after the automatic activation process is terminated and the follow-up of the wavelength under the AFC starts, the activation/deactivation of the AFC is automatically executed in accordance with the presence/absence of the received optical signal, as illustrated in the flowchart in FIG. 19.

After the automatic activation process is terminated, an external monitor device (not shown) always checks via the CPU 10 whether or not the optical input is present (step S10).

When there is a optical input, the AFC is enabled (step S12) and the current control parameter of the optical filter is written in the data table in the RAM 11 every given time (step S13).

When it is determined in step S11 that no optical input is received, a timer is reset (step S14) and writing to the data table is inhibited at the same time (step S15). The AFC is then disabled (step S16).

Then, the control parameter in the data table is set to the state it was before the disabling of the AFC (step S17). Further, it is determined if the value of the timer is within a predetermined time (step S18).

When the value of the timer is within the predetermined time, the flow returns to step S10 to check if there is an optical input. When the value of the timer exceeds the predetermined time, the flow jumps to the automatic activation routine (step S19). When the flow enters the automatic activation routine, the above-described initialization in FIG. 17 will be performed (step S1).

Even if the wavelength of the transmission light source changes greatly and the state of no signal input continues long enough to go beyond the lock range of the AFC, or if the transmission device is exchanged and the transmission wavelength is changed accordingly, the automatic activation routine is called after a given time passes. This design can prevent the signal waiting state from continuing too long, thus allowing the activation control to be executed after the given time.

FIG. 20 exemplifies an operational flowchart in the case where two parameters, such as temperature control and voltage control, are combined. In particular, the combination of control parameters can widen the follow-up range for an optical filter which has a plurality of control parameters.

In FIG. 20 it is assumed that the AFC is executed by the control parameter 1. First, with the AFC loop closed (AFC enabled), the value of the control parameter 1 is measured (step S20).

Then, the optimal value (initial control value) is compared with the measured present value of the control parameter 1 to acquire the absolute value of the difference and the sign of the difference (step S21).

Then, the absolute value is compared with a certain threshold value (which provides the range for excellent control) (step S22). When the control value exceeds the threshold value, the value of the control parameter 2 is altered in accordance with the degree of the control value and the characteristic. When the absolute value is equal to or larger than the threshold value (step S23), it is further determined if the control parameter is within the effective control range (step B24). With the control parameter falling in the effective control range, the control parameter 2 incremented by one step before terminating this flow (step S25).

If it is determined in step B24 that the control parameter 2 is out of the effective control range, the upper limit of the control parameter is set (step S28). Then, an alarm signal is generated (step S29).

When the absolute value is equal to or larger than the threshold value in step S23, i.e., if the difference between the measured value and the optimal control value equals or exceeds the threshold value, it is then determined if the control parameter 2 falls within the effective control range (step S30). When the control parameter 2 falls within the effective control range, the control parameter 2 is decremented by one step (step S31).

When the control parameter 2 is out of the effective control range, the lower limit of the control parameter 2 is set (step S33). Then, an alarm signal is generated (step S34).

As another wavelength follow-up scheme, in the wavelength follow-up control by the sync detection shown in FIG. 13, the amplitude of the low-frequency signal (modulation signal) from the oscillator 545 is set sufficiently high at the beginning of the control, then the modulation amplitude is narrowed into the control voltage range in which a certain error signal is obtained from the sync detector 542, and thereafter, the flow goes to the ordinary AFC control.

This scheme is particularly effective in controlling the optical filter which uses an interferometer having a relatively low fineness.

Figure 21:
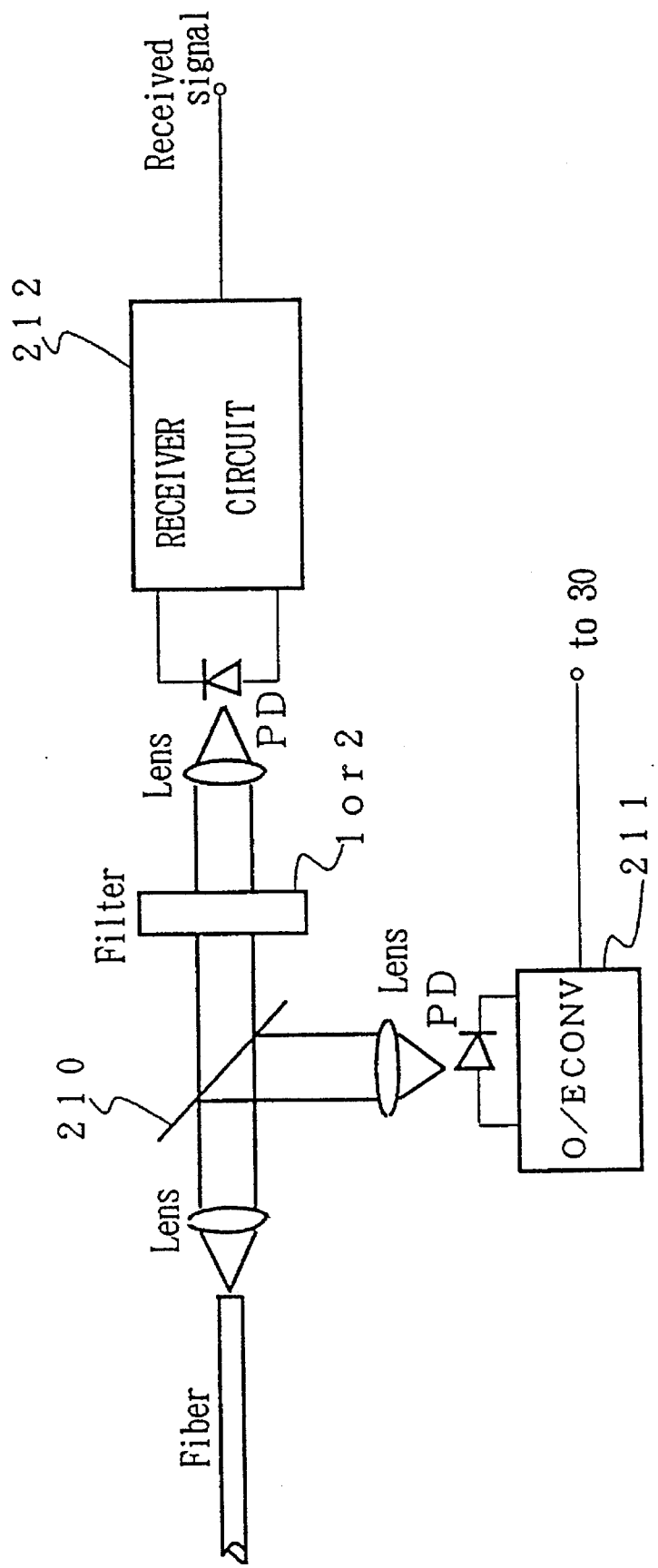
FIG. 21 is a block diagram showing another structure of an optical receiver designed for follow-up control.
Figure 22:
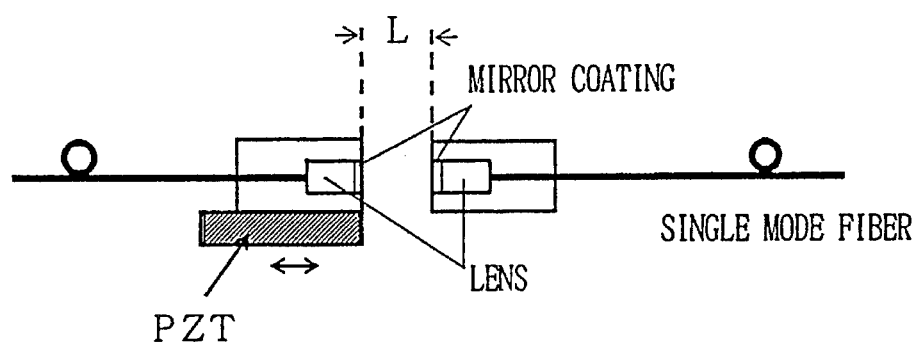
FIG. 22 is a diagram showing a first example of the structure of a conventional optical filter.
Figure 23:
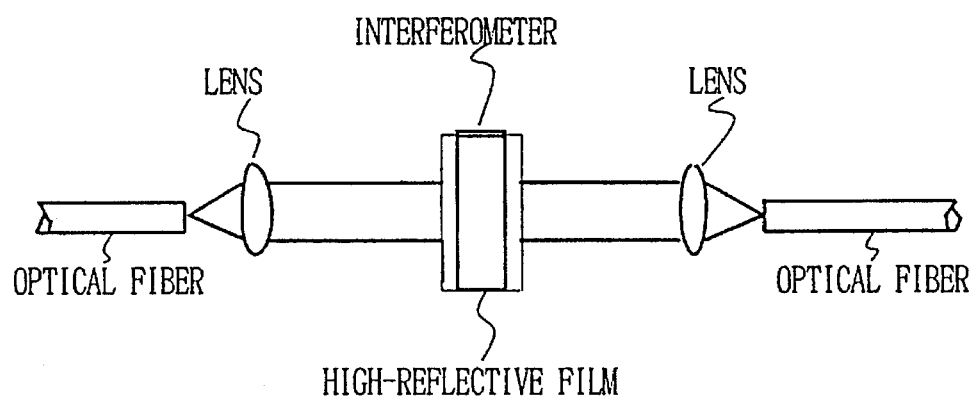
FIG. 23 is a diagram showing a second example of the structure of the conventional optical filter.

Alternatively, a photosensor 211 may be provided at the position where light does not pass through the optical filters 1 and 2 as shown in FIG. 21, so that automatic activation can start depending of whether or not the photosensor 211 detects a optical input.

In FIG. 21, the received signal sent over the fiber is led to the photosensor 211, located before the filter 1 or 2, by a half-transparent mirror 210. This scheme can stop waveform sweeping when no light signal has arrived, and is thus effective particularly in the case where frequency wavelength sweeping is not desired because the wavelength control parameter of the optical filter is temperature or the like.

In short, the present invention can ensure selective reception of high-density multiplexed signals with the existing simple optical filters and can thus accomplish a highly reliable and low-cost optical communication system.

Further, this invention can accomplish a stable narrow-band optical filter of a Fabry-Perot interferometer type without adjustment. Furthermore, this invention can ensure automatic activation control of a narrow-band optical filter and control that can effectively follows up a change in the wavelength of a laser diode, thus providing the same operability as the existing optical communication systems.

The present invention may be embodied in other specific forms without departing from the spirit or essential characteristics thereof.

The present examples and embodiment are therefore to be considered in all respects as illustrative and not restrictive. The scope of the invention being indicated by the appended claims rather than by the foregoing description, and all changes, which come within the meaning and range of equivalency of the claims are therefore intended to be embraced therein.

What is claimed is:

1. An optical filter for selectively outputting an optical signal of a desired signal from a plurality of optical frequency-division multiplexing signals, the optical filter comprising:

input means for receiving the plurality of optical frequency-division multiplexing signals;

a first optical filter, coupled to the input means, which receives and filters the plurality of optical frequency-division multiplexing signals, said first optical filter having a transmission bandwidth with a single peak in which optical frequencies of the plurality of optical frequency-division multiplexing signals are included and a full width at half maximum in the transmission bandwidth equal to or smaller than two times a channel interval of the optical frequency-division multiplexing signals, said first optical filter outputting optical frequency signals, of the optical frequency-division multiplexing signals, within the transmission bandwidth; and a second optical filter which receives and filters the optical frequency signals from said first optical filter, said second optical filter having periodic transmission and attenuation characteristics, a free spectral range of said second optical filter being set as the optical frequencies at channels adjacent to a central channel of the desired signal, the optical frequency signal of which is to be selected to be equivalent to optical frequencies at maximum attenuations of the attenuation characteristic, said second optical filter outputting the optical signal.

2. The optical filter according to claim 1, wherein the second optical filter is a solid Fabry-Perot resonator made of silicon.

3. The optical filter according to claim 1, wherein the second optical filter is a solid Fabry-Perot resonator made of gallium arsenide.

4. The optical filter according to claim 1 wherein said second optical filter is comprised of semiconductor material.

5. An optical filter according to claim 1, further comprising:

current supply means for supplying current flow to said second optical filter; and control means for controlling said current supply means supply of the current flow so as to alter a transmission wavelength of said second optical filter.

6. The optical receiver according to claim 5, wherein:

said second optical filter has a temperature;

said control means comprises a circuit for performing temperature control to stabilize the temperature of said second optical filter; and said second optical filter is a Fabry-Perot resonator made of silicon and provided with a heating member.

7. The optical filter according to claim 5, wherein:

said second optical filter is a solid Fabry-Perot resonator made of silicon and comprises measuring means for measuring an electric resistance of the solid Fabry-Perot resonator; and said control means controls the current supply means in accordance with the electric resistance measured by the measuring means.

8. A method of controlling a transmission wavelength of an optical filter, the method comprising the steps of:

(a) sweeping a transmission wavelength of the optical filter;

(b) detecting a maximum optical reception input during sweeping in step (a);

(c) fixing the transmission wavelength of the optical filter to a wavelength of the maximum optical reception input;

(d) releasing the transmission wavelength of the optical filter from being fixed when an optical reception input is no longer detected, to restart the sweeping in step (a); and (e) following up a change in the wavelength of the maximum optical reception input.

9. An optical signal receiver comprising:

an input terminal which receives a plurality of optical frequency-division multiplexing signals having a transmission bandwidth;

a first optical filter, coupled to said input terminal, which receives and filters the plurality of optical frequency-division multiplexing signals, said first optical filter having a filter transmission bandwidth and outputting optical signals within the transmission bandwidth of the optical frequency-division multiplexing signals;

a second optical filter having a periodic transmission band characteristic, which receives the optical signals output from said first optical filter and outputs one optical signal of the received optical signals;

photo detecting means coupled between said first optical filter said second optical filter for detecting a reception of the optical signals;

memory means for storing a control parameter;

an oscillation source for generating a frequency signal having a frequency; and control means, coupled to said first and second optical filters, said photo detecting means, said memory means and said oscillation source, for sweeping the frequency of the frequency signal output by said oscillation source, fixing respective transmission wavelengths of said first and second optical filters to a wavelength of a desired optical signal according to the control parameter stored in said memory means, rewriting a current control parameter into said memory means as the control parameter, at each specified time while reception of the optical signals is detected by said photo detecting means, and stopping the rewriting of the current control parameter and allowing a free running, of said first and second optical filters with the control parameter stored in the memory means when the reception of the optical signals is not detected, until the reception of the optical signals is detected again.

10. An optical signal receiver according to claim 9, further comprising an automatic frequency controller coupled to said first and second filters and said oscillation source for adjusting, after said control means fixes the respective transmission wavelengths of said first and second filters to the wavelength of the desired optical signal, the fixed transmission wavelengths of said first and second filters so as to follow up a change in the frequency of the frequency signal output from said oscillation source.

11. The optical signal receiver according to claim 10, wherein said automatic frequency controller comprises a low frequency oscillator and a sync detector, and adds a minute modulated signal from the low frequency oscillator to an error signal output of the sync detector so as to produce a result and adjusts the transmission wavelength of said first and second optical filters based on the result of the addition.

12. An optical filter for selectively outputting an optical signal of a desired signal from a plurality of optical frequency-division multiplexing signals, the optical filter comprising:

input means for receiving the plurality of optical frequency-division multiplexing signals;

a first optical filter coupled to said input means which receives and filters the frequency-division multiplexing signals, said first optical filter having periodic transmission and attenuation characteristics, a free spectral range of said first optical filter being set as optical frequencies at channels adjacent to a central channel of the desired signal, the central channel having an optical frequency which is to be selected to be equivalent to frequencies at maximum attenuations in the attenuation characteristic, and outputs optical frequency signals within the transmission bandwidth; and a second optical filter which receives the optical frequency signals, filters said optical frequency signals received, said second optical filter having a transmission bandwidth with a single peak in which frequencies of the plurality of optical frequency-division multiplexing signals are included and a full width at half maximum in the transmission bandwidth is equal to or smaller than two times a channel interval of the optical frequency division multiplexing signals, and outputs the output optical signal of the desired signal.

\* \* \* \* \*

UNITED STATES PATENT AND TRADEMARK OFFICE
CERTIFICATE OF CORRECTION

PATENT NO. : 5,469,288
DATED : November 21, 1995
INVENTOR(S) : Hiroshi ONAKA et al.

It is certified that error appears in the above-indentified patent and that said Letters Patent is hereby corrected as shown below:

Column 1, line 8, delete "1."; and line 14, delete "2.".

Column 5, line 9, after "AFC" insert –54;–.

Column 7, line 11 in the equation, before "0.5" delete "w";

line 25, Equation 1, delete "(db)" and insert –(dB)– therein; and line 52, after "filter" insert –,–.

Column 13, line 67, after "signal" insert –+–.

Column 14, line 55, after "31 and" insert –41,–.

Signed and Sealed this

Twelfth Day of March, 1996

Attest:

BRUCE LEHMAN

Attesting Officer     Commissioner of Patents and Trademarks